(12) United States Patent
Strandzhev et al.

(10) Patent No.: US 9,946,565 B2
(45) Date of Patent: Apr. 17, 2018

(54) MANAGEMENT OF CLOUD-COMPUTING FACILITY THROUGH A VIRTUAL INFRASTRUCTURE MANAGEMENT SERVER

(71) Applicant: VMware, Inc., Palo Alto, CA (US)

(72) Inventors: Ivaylo Petkov Strandzhev, Sofia (BG); Asen Alexandrov, Sofia (BG); Danail Grigorov, Sofia (BG); Ilko Dragoev, Sofia (BG)

(73) Assignee: VMware, Inc., Palo Alto, CA (US)

( * ) Notice: Subject to any disclaimer, the term of this patent is extended or adjusted under 35 U.S.C. 154(b) by 279 days.

(21) Appl. No.: 14/755,254

(22) Filed: Jun. 30, 2015

(65) Prior Publication Data

US 2017/0005873 A1    Jan. 5, 2017

(51) Int. Cl.
*G06F 15/173*    (2006.01)
*G06F 9/455*    (2018.01)
*H04L 29/08*    (2006.01)
*H04L 12/24*    (2006.01)

(52) U.S. Cl.
CPC .......... *G06F 9/45558* (2013.01); *H04L 67/02* (2013.01); *H04L 67/2823* (2013.01); *G06F 2009/45595* (2013.01); *H04L 41/044* (2013.01)

(58) Field of Classification Search
CPC ................. H04L 41/12; H04L 67/10
See application file for complete search history.

(56) References Cited

U.S. PATENT DOCUMENTS

2015/0052517 A1\* 2/2015 Raghu ................... G06F 9/4856
718/1

\* cited by examiner

*Primary Examiner* — Glenford Madamba

(57) ABSTRACT

The current document is directed to methods for aggregating host computers into distributed computing systems and to distributed computing systems created by the methods. In a described implementation, host computers are aggregated into two or more clusters, at a first distributed-computing-system level, each managed by a second-level management server. The two or more clusters are then, in turn, aggregated into a hierarchical distributed computing system managed by a top-level management server. The top-level management server is interconnected to, and accesses, the second-level management servers through a host-gateway appliance that includes host-gateway control logic implemented within a server computer. In order to achieve scalability and efficiency, the top-level management server provides a subset of the native management commands to system administrators and other users who access a management interface provided by the top-level management server.

20 Claims, 30 Drawing Sheets

MANAGEMENT OF CLOUD-COMPUTING FACILITY THROUGH A VIRTUAL INFRASTRUCTURE MANAGEMENT SERVER

TECHNICAL FIELD

The current document is directed to aggregation of computers into distributed computing systems and, in particular, to methods, and distributed-computing-systems by the methods, that provide for management of a cloud-computing facility by a VI management server.

BACKGROUND

Early computer systems were monolithic, single-processor systems that executed only a single task at each point in time. The early computer systems lacked operating systems and basic programming facilities such as assemblers and compilers. During the first several decades of the computer revolution, many of the basic single-system components of computer systems were developed and evolved to produce capable, operating-system-controlled, multi-tasking computer systems. For another decade, rapid evolution of processor technology, data-storage technologies, memory, and communications technologies led to dramatic increases in the capabilities and capacities of single-processor computer systems. Ultimately, however, in order to achieve even greater capabilities and capacities, computer-system designers turned to multi-processor systems and then to more complex, distributed computing systems comprising aggregations of many intercommunicating computer systems. This turn towards distributed computing was facilitated by the development of distributed locking methods for controlling access to distributed computing resources, distributed operating systems, and high-bandwidth electronic communications. During the past few decades, extremely large cloud-computing facilities have been developed and commercialized to the point that computational bandwidth and data-storage capacity are provided to customers of large cloud-computing providers much as electrical power and water are provided to customers of utility companies. Cloud-computing facilities often employ hundreds, thousands, or more networked and often geographically distributed multi-processor servers that are controlled, by virtualization technology, to produce hierarchical layers of virtualized computing facilities. The development and evolution of cloud-computing facilities has greatly increased available computational bandwidths and data-storage capacities for computer-services users, but has also increased management overheads and complexities to the point that continued upward scaling of virtual data centers is now encountering a variety of technological constraints and barriers. Designers, developers, administrators, and users of cloud-computing facilities and other large distributed computing systems therefore continue to seek new approaches to implementing distributed systems and managing distributed systems to provide easier management and greater scalability.

SUMMARY

The current document is directed to methods for aggregating host computers into distributed computing systems and to distributed computing systems created by the methods. In a described implementation, host computers are aggregated into two or more clusters, at a first distributed-computing-system level, each managed by a second-level management server. The two or more clusters are then, in turn, aggregated into a hierarchical distributed computing system managed by a top-level management server. The top-level management server is interconnected to, and accesses, the second-level management servers through a host-gateway appliance that includes host-gateway control logic implemented within a server computer. In order to achieve scalability and efficiency, the top-level management server provides a subset of the native management commands to system administrators and other users who access a management interface provided by the top-level management server.

BRIEF DESCRIPTION OF THE DRAWINGS

In FIG. 9, three different physical data centers 902-904 are shown below planes representing the cloud-director layer of abstraction 906-908.

DETAILED DESCRIPTION OF EMBODIMENTS

Figure 1:
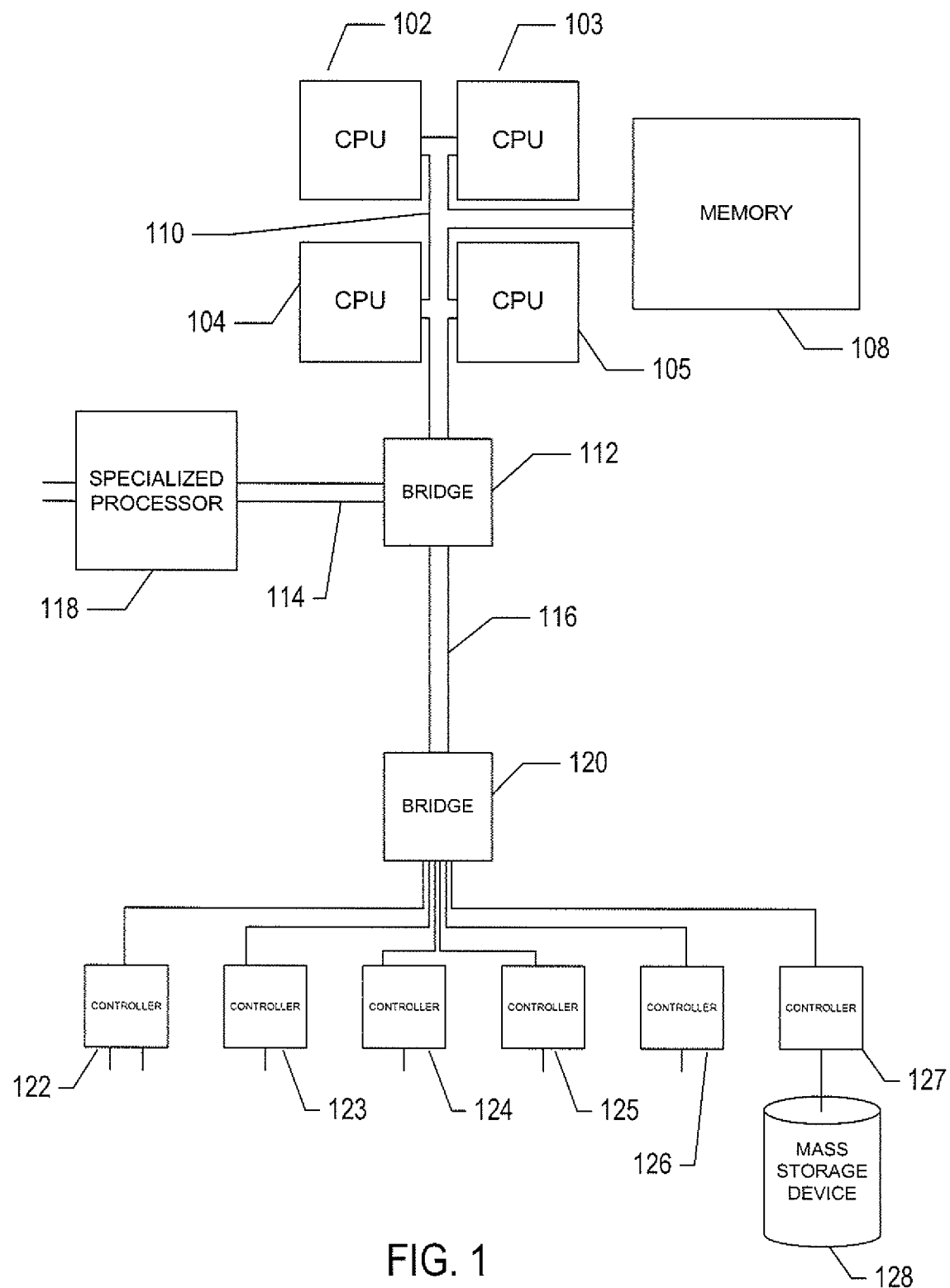
FIG. 1 provides a general architectural diagram for various types of computers.

The current document is directed to methods for aggregating host computers into distributed computing systems and to distributed computing systems created by the methods. In a first subsection, below, a detailed description of computer hardware, complex computational systems, and virtualization is provided with reference to FIGS. 1-12. In a second subsection, host-gateway appliances are discussed. In a third subsection, implementations of the currently disclosed methods and systems are discussed.

Computer Hardware, Complex Computational Systems, and Virtualization

The term "abstraction" is not, in any way, intended to mean or suggest an abstract idea or concept. Computational abstractions are tangible, physical interfaces that are implemented, ultimately, using physical computer hardware, data-storage devices, and communications systems. Instead, the term "abstraction" refers, in the current discussion, to a logical level of functionality encapsulated within one or more concrete, tangible, physically-implemented computer systems with defined interfaces through which electronically-encoded data is exchanged, process execution launched, and electronic services are provided. Interfaces may include graphical and textual data displayed on physical display devices as well as computer programs and routines that control physical computer processors to carry out various tasks and operations and that are invoked through electronically implemented application programming interfaces ("APIs") and other electronically implemented interfaces. There is a tendency among those unfamiliar with modern technology and science to misinterpret the terms "abstract" and "abstraction," when used to describe certain aspects of modern computing. For example, one frequently encounters assertions that, because a computational system is described in terms of abstractions, functional layers, and interfaces, the computational system is somehow different from a physical machine or device. Such allegations are unfounded. One only needs to disconnect a computer system or group of computer systems from their respective power supplies to appreciate the physical, machine nature of complex computer technologies. One also frequently encounters statements that characterize a computational technology as being "only software," and thus not a machine or device. Software is essentially a sequence of encoded symbols, such as a printout of a computer program or digitally encoded computer instructions sequentially stored in a file on an optical disk or within an electromechanical mass-storage device. Software alone can do nothing. It is only when encoded computer instructions are loaded into an electronic memory within a computer system and executed on a physical processor that so-called "software implemented" functionality is provided. The digitally encoded computer instructions are an essential and physical control component of processor-controlled machines and devices, no less essential and physical than a cam-shaft control system in an internal-combustion engine. Multi-cloud aggregations, cloud-computing services, virtual-machine containers and virtual machines, communications interfaces, and many of the other topics discussed below are tangible, physical components of physical, electro-optical-mechanical computer systems.

FIG. 1 provides a general architectural diagram for various types of computers. The computer system contains one or multiple central processing units ("CPUs") 102-105, one or more electronic memories 108 interconnected with the CPUs by a CPU/memory-subsystem bus 110 or multiple busses, a first bridge 112 that interconnects the CPU/memory-subsystem bus 110 with additional busses 114 and 116, or other types of high-speed interconnection media, including multiple, high-speed serial interconnects. These busses or serial interconnections, in turn, connect the CPUs and memory with specialized processors, such as a graphics processor 118, and with one or more additional bridges 120, which are interconnected with high-speed serial links or with multiple controllers 122-127, such as controller 127, that provide access to various different types of mass-storage devices 128, electronic displays, input devices, and other such components, subcomponents, and computational resources. It should be noted that computer-readable data-storage devices include optical and electromagnetic disks, electronic memories, and other physical data-storage devices. Those familiar with modern science and technology appreciate that electromagnetic radiation and propagating signals do not store data for subsequent retrieval, and can transiently "store" only a byte or less of information per mile, far less information than needed to encode even the simplest of routines.

Of course, there are many different types of computer-system architectures that differ from one another in the number of different memories, including different types of hierarchical cache memories, the number of processors and the connectivity of the processors with other system components, the number of internal communications busses and serial links, and in many other ways. However, computer systems generally execute stored programs by fetching instructions from memory and executing the instructions in one or more processors. Computer systems include general-purpose computer systems, such as personal computers ("PCs"), various types of servers and workstations, and higher-end mainframe computers, but may also include a plethora of various types of special-purpose computing devices, including data-storage systems, communications routers, network nodes, tablet computers, and mobile telephones.

Figure 2:
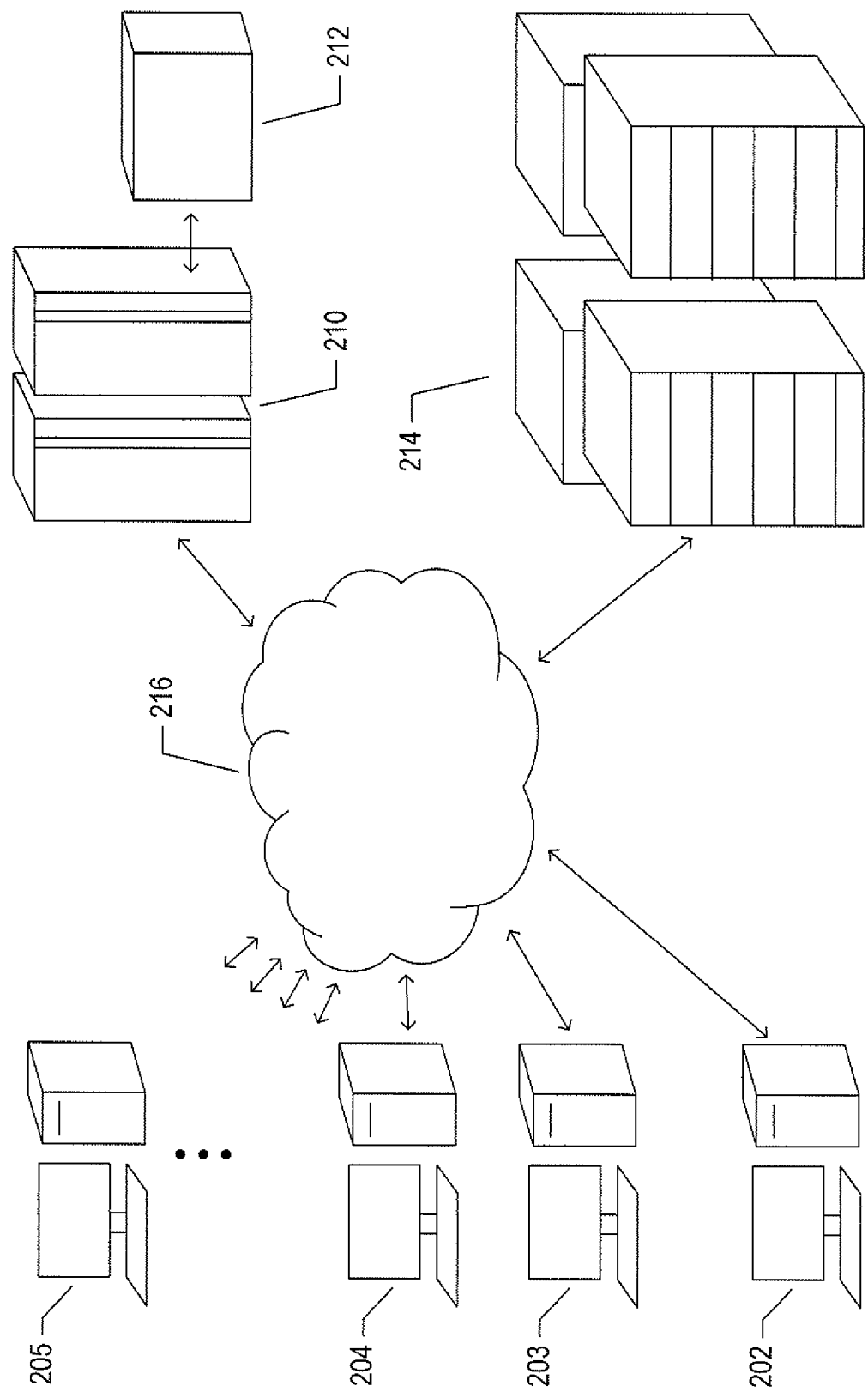
FIG. 2 illustrates an Internet-connected distributed computer system.

FIG. 2 illustrates an Internet-connected distributed computer system. As communications and networking technologies have evolved in capability and accessibility, and as the computational bandwidths, data-storage capacities, and other capabilities and capacities of various types of computer systems have steadily and rapidly increased, much of modern computing now generally involves large distributed systems and computers interconnected by local networks, wide-area networks, wireless communications, and the Internet. FIG. 2 shows a typical distributed system in which a large number of PCs 202-205, a high-end distributed mainframe system 210 with a large data-storage system 212, and a large computer center 214 with large numbers of rack-mounted servers or blade servers all interconnected through various communications and networking systems that together comprise the Internet 216. Such distributed computing systems provide diverse arrays of functionalities. For example, a PC user sitting in a home office may access hundreds of millions of different web sites provided by hundreds of thousands of different web servers throughout the world and may access high-computational-bandwidth computing services from remote computer facilities for running complex computational tasks.

Until recently, computational services were generally provided by computer systems and data centers purchased, configured, managed, and maintained by service-provider organizations. For example, an e-commerce retailer generally purchased, configured, managed, and maintained a data center including numerous web servers, back-end computer systems, and data-storage systems for serving web pages to remote customers, receiving orders through the web-page interface, processing the orders, tracking completed orders, and other myriad different tasks associated with an e-commerce enterprise.

Figure 3:
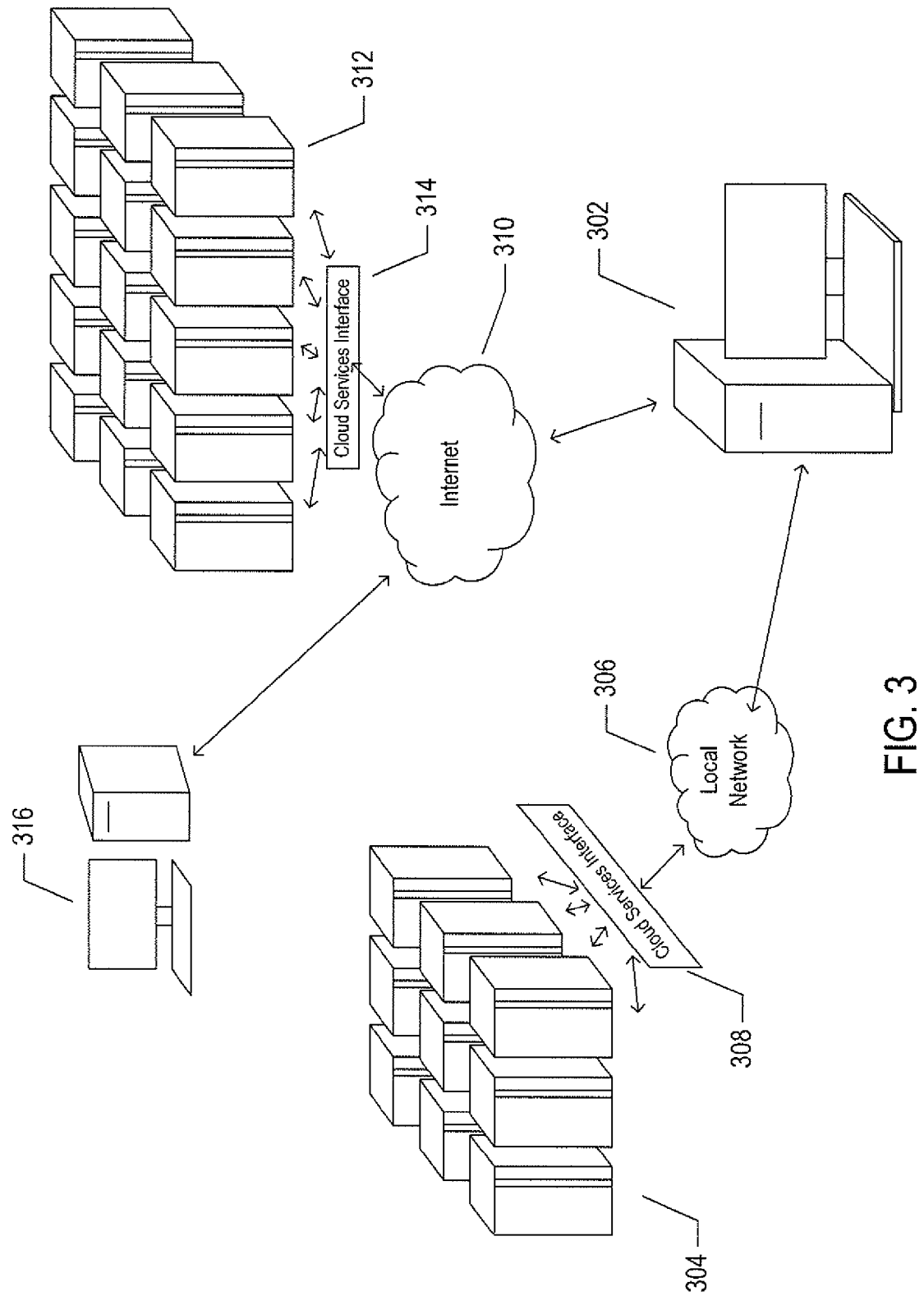
FIG. 3 illustrates cloud computing. In the recently developed cloud-computing paradigm, computing cycles and data-storage facilities are provided to organizations and individuals by cloud-computing providers.

FIG. 3 illustrates cloud computing. In the recently developed cloud-computing paradigm, computing cycles and data-storage facilities are provided to organizations and individuals by cloud-computing providers. In addition, larger organizations may elect to establish private cloud-computing facilities in addition to, or instead of, subscribing to computing services provided by public cloud-computing service providers. In FIG. 3, a system administrator for an organization, using a PC 302, accesses the organization's private cloud 304 through a local network 306 and private-cloud interface 308 and also accesses, through the Internet 310, a public cloud 312 through a public-cloud services interface 314. The administrator can, in either the case of the private cloud 304 or public cloud 312, configure virtual computer systems and even entire virtual data centers and launch execution of application programs on the virtual computer systems and virtual data centers in order to carry out any of many different types of computational tasks. As one example, a small organization may configure and run a virtual data center within a public cloud that executes web servers to provide an e-commerce interface through the public cloud to remote customers of the organization, such as a user viewing the organization's e-commerce web pages on a remote user system 316.

Cloud-computing facilities are intended to provide computational bandwidth and data-storage services much as utility companies provide electrical power and water to consumers. Cloud computing provides enormous advantages to small organizations without the resources to purchase, manage, and maintain in-house data centers. Such organizations can dynamically add and delete virtual computer systems from their virtual data centers within public clouds in order to track computational-bandwidth and data-storage needs, rather than purchasing sufficient computer systems within a physical data center to handle peak computational-bandwidth and data-storage demands. Moreover, small organizations can completely avoid the overhead of maintaining and managing physical computer systems, including hiring and periodically retraining information-technology specialists and continuously paying for operating-system and database-management-system upgrades. Furthermore, cloud-computing interfaces allow for easy and straightforward configuration of virtual computing facilities, flexibility in the types of applications and operating systems that can be configured, and other functionalities that are useful even for owners and administrators of private cloud-computing facilities used by a single organization.

Figure 4:
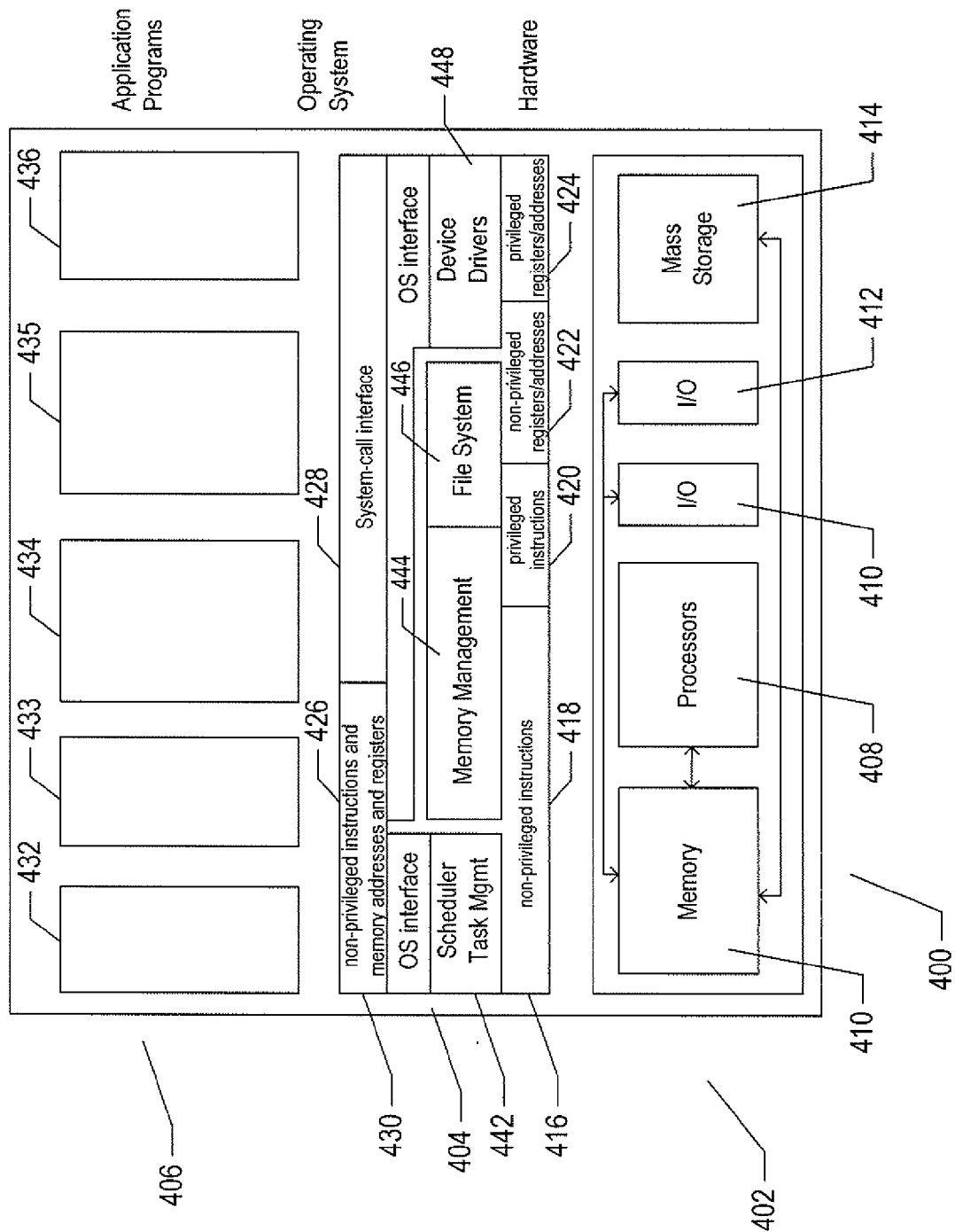
FIG. 4 illustrates generalized hardware and software components of a general-purpose computer system, such as a general-purpose computer system having an architecture similar to that shown in FIG. 1.

FIG. 4 illustrates generalized hardware and software components of a general-purpose computer system, such as a general-purpose computer system having an architecture similar to that shown in FIG. 1. The computer system 400 is often considered to include three fundamental layers: (1) a hardware layer or level 402; (2) an operating-system layer or level 404; and (3) an application-program layer or level 406. The hardware layer 402 includes one or more processors 408, system memory 410, various different types of input-output ("I/O") devices 410 and 412, and mass-storage devices 414. Of course, the hardware level also includes many other components, including power supplies, internal communications links and busses, specialized integrated circuits, many different types of processor-controlled or microprocessor-controlled peripheral devices and controllers, and many other components. The operating system 404 interfaces to the hardware level 402 through a low-level operating system and hardware interface 416 generally comprising a set of non-privileged computer instructions 418, a set of privileged computer instructions 420, a set of non-privileged registers and memory addresses 422, and a set of privileged registers and memory addresses 424. In general, the operating system exposes non-privileged instructions, non-privileged registers, and non-privileged memory addresses 426 and a system-call interface 428 as an operating-system interface 430 to application programs 432-436 that execute within an execution environment provided to the application programs by the operating system. The operating system, alone, accesses the privileged instructions, privileged registers, and privileged memory addresses. By reserving access to privileged instructions, privileged registers, and privileged memory addresses, the operating system can ensure that application programs and other higher-level computational entities cannot interfere with one another's execution and cannot change the overall state of the computer system in ways that could deleteriously impact system operation. The operating system includes many internal components and modules, including a scheduler 442, memory management 444, a file system 446, device drivers 448, and many other components and modules. To a certain degree, modern operating systems provide numerous levels of abstraction above the hardware level, including virtual memory, which provides to each application program and other computational entities a separate, large, linear memory-address space that is mapped by the operating system to various electronic memories and mass-storage devices. The scheduler orchestrates interleaved execution of various different application programs and higher-level computational entities, providing to each application program a virtual, stand-alone system devoted entirely to the application program. From the application program's standpoint, the application program executes continuously without concern for the need to share processor resources and other system resources with other application programs and higher-level computational entities. The device drivers abstract details of hardware-component operation, allowing application programs to employ the system-call interface for transmitting and receiving data to and from communications networks, mass-storage devices, and other I/O devices and subsystems. The file system 436 facilitates abstraction of mass-storage-device and memory resources as a high-level, easy-to-access, file-system interface. Thus, the development and evolution of the operating system has resulted in the generation of a type of multi-faceted virtual execution environment for application programs and other higher-level computational entities.

While the execution environments provided by operating systems have proved to be an enormously successful level of abstraction within computer systems, the operating-system-provided level of abstraction is nonetheless associated with difficulties and challenges for developers and users of application programs and other higher-level computational entities. One difficulty arises from the fact that there are many different operating systems that run within various different types of computer hardware. In many cases, popular application programs and computational systems are developed to run on only a subset of the available operating systems, and can therefore be executed within only a subset of the various different types of computer systems on which the operating systems are designed to run. Often, even when an application program or other computational system is ported to additional operating systems, the application program or other computational system can nonetheless run more efficiently on the operating systems for which the application program or other computational system was originally targeted. Another difficulty arises from the increasingly distributed nature of computer systems. Although distributed operating systems are the subject of considerable research and development efforts, many of the popular operating systems are designed primarily for execution on a single computer system. In many cases, it is difficult to move application programs, in real time, between the different computer systems of a distributed computer system for high-availability, fault-tolerance, and load-balancing purposes. The problems are even greater in heterogeneous distributed computer systems which include different types of hardware and devices running different types of operating systems. Operating systems continue to evolve, as a result of which certain older application programs and other computational entities may be incompatible with more recent versions of operating systems for which they are targeted, creating compatibility issues that are particularly difficult to manage in large distributed systems.

Figure 5A:
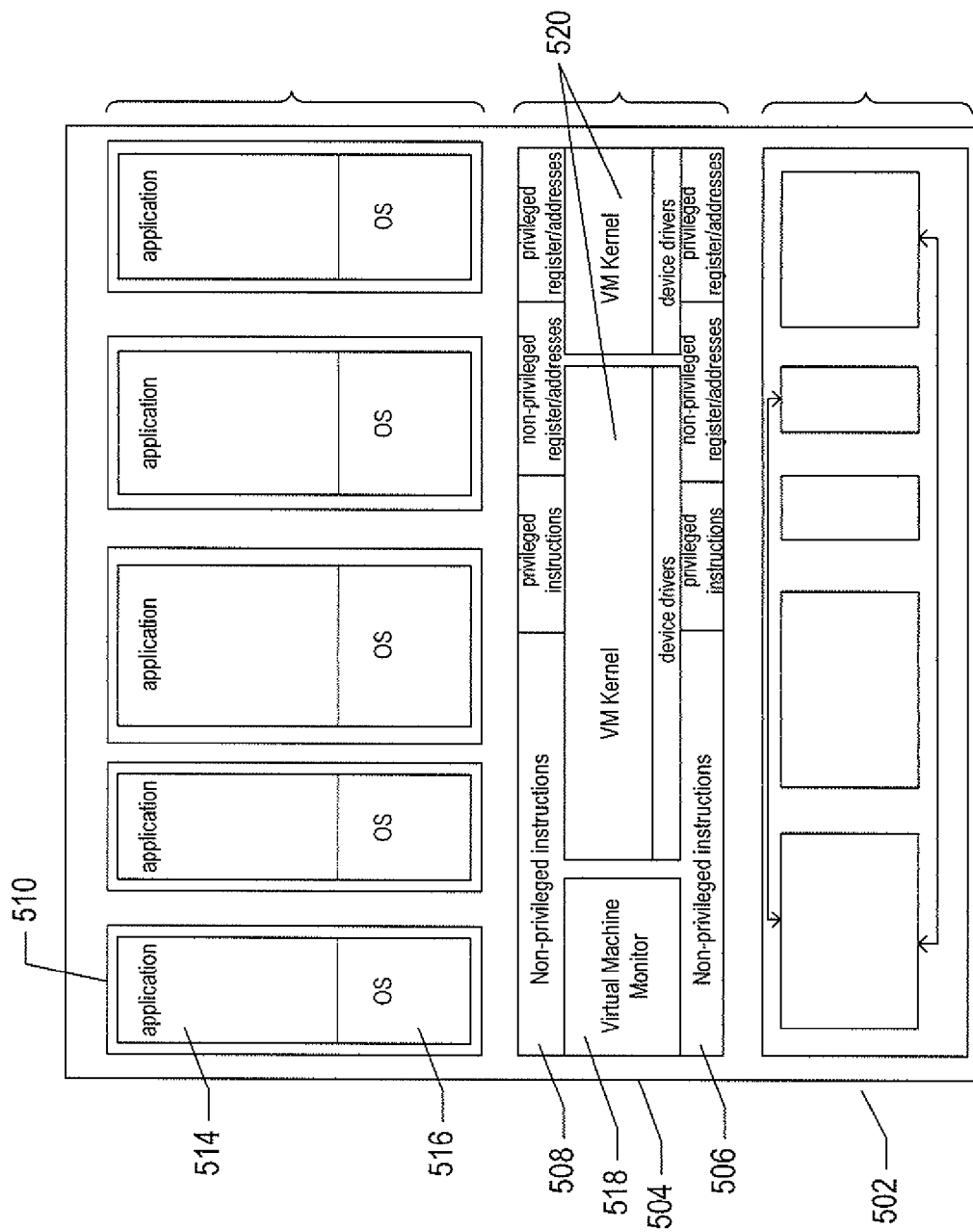
FIGS. 5A-B illustrate two types of virtual machine and virtual-machine execution environments.
Figure 5B:
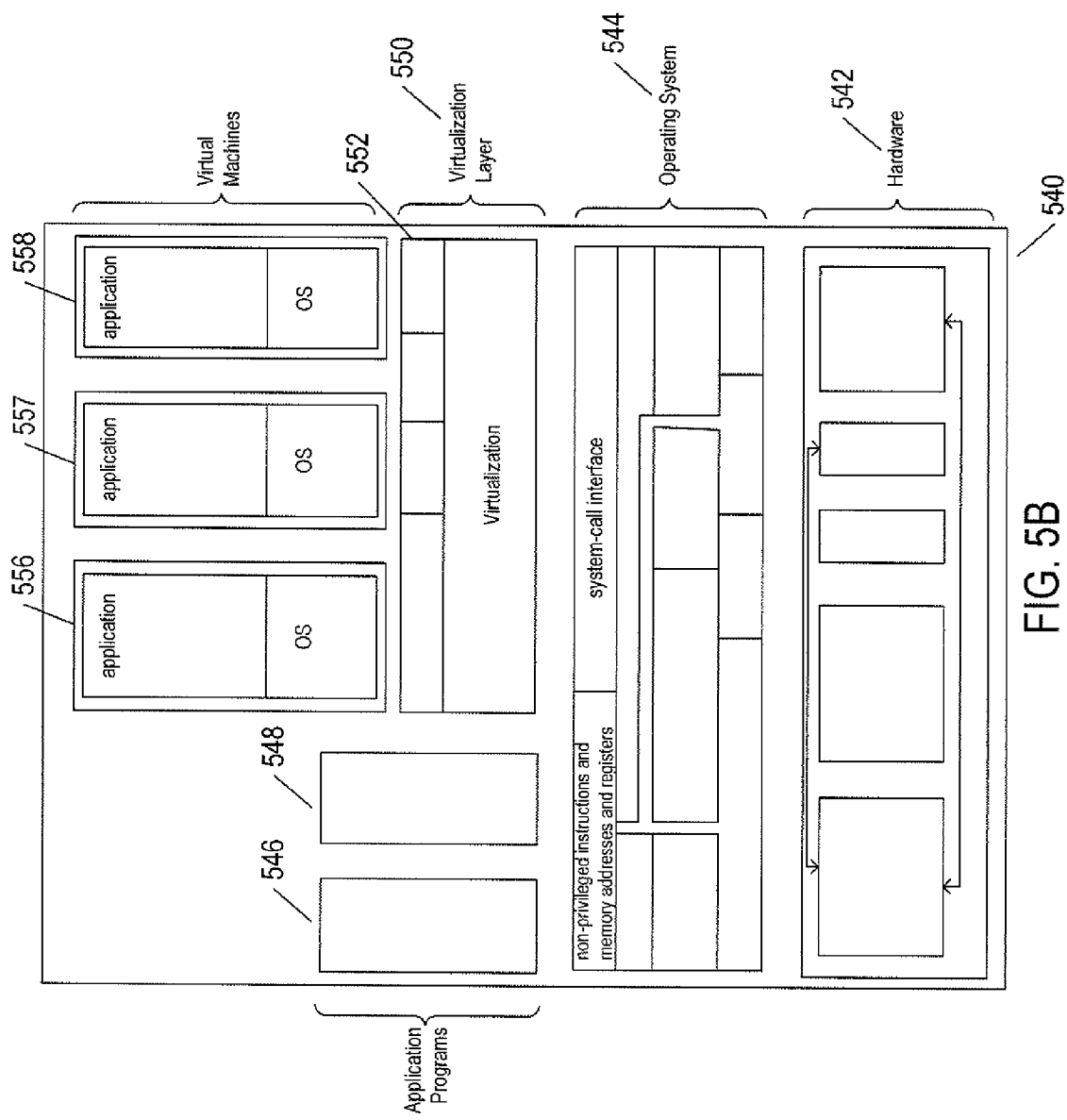

For all of these reasons, a higher level of abstraction, referred to as the "virtual machine," has been developed and evolved to further abstract computer hardware in order to address many difficulties and challenges associated with traditional computing systems, including the compatibility issues discussed above. FIGS. 5A-B illustrate two types of virtual machine and virtual-machine execution environments. FIGS. 5A-B use the same illustration conventions as used in FIG. 4. FIG. 5A shows a first type of virtualization. The computer system 500 in FIG. 5A includes the same hardware layer 502 as the hardware layer 402 shown in FIG. 4. However, rather than providing an operating system layer directly above the hardware layer, as in FIG. 4, the virtualized computing environment illustrated in FIG. 5A features a virtualization layer 504 that interfaces through a virtualization-layer/hardware-layer interface 506, equivalent to interface 416 in FIG. 4, to the hardware. The virtualization layer provides a hardware-like interface 508 to a number of virtual machines, such as virtual machine 510, executing above the virtualization layer in a virtual-machine layer 512. Each virtual machine includes one or more application programs or other higher-level computational entities packaged together with an operating system, referred to as a "guest operating system," such as application 514 and guest operating system 516 packaged together within virtual machine 510. Each virtual machine is thus equivalent to the operating-system layer 404 and application-program layer 406 in the general-purpose computer system shown in FIG. 4. Each guest operating system within a virtual machine interfaces to the virtualization-layer interface 508 rather than to the actual hardware interface 506. The virtualization layer partitions hardware resources into abstract virtual-hardware layers to which each guest operating system within a virtual machine interfaces. The guest operating systems within the virtual machines, in general, are unaware of the virtualization layer and operate as if they were directly accessing a true hardware interface. The virtualization layer ensures that each of the virtual machines currently executing within the virtual environment receive a fair allocation of underlying hardware resources and that all virtual machines receive sufficient resources to progress in execution. The virtualization-layer interface 508 may differ for different guest operating systems. For example, the virtualization layer is generally able to provide virtual hardware interfaces for a variety of different types of computer hardware. This allows, as one example, a virtual machine that includes a guest operating system designed for a particular computer architecture to run on hardware of a different architecture. The number of virtual machines need not be equal to the number of physical processors or even a multiple of the number of processors.

The virtualization layer includes a virtual-machine-monitor module 518 ("VMM") that virtualizes physical processors in the hardware layer to create virtual processors on which each of the virtual machines executes. For execution efficiency, the virtualization layer attempts to allow virtual machines to directly execute non-privileged instructions and to directly access non-privileged registers and memory. However, when the guest operating system within a virtual machine accesses virtual privileged instructions, virtual privileged registers, and virtual privileged memory through the virtualization-layer interface 508, the accesses result in execution of virtualization-layer code to simulate or emulate the privileged resources. The virtualization layer additionally includes a kernel module 520 that manages memory, communications, and data-storage machine resources on behalf of executing virtual machines ("VM kernel"). The VM kernel, for example, maintains shadow page tables on each virtual machine so that hardware-level virtual-memory facilities can be used to process memory accesses. The VM kernel additionally includes routines that implement virtual communications and data-storage devices as well as device drivers that directly control the operation of underlying hardware communications and data-storage devices. Similarly, the VM kernel virtualizes various other types of I/O devices, including keyboards, optical-disk drives, and other such devices. The virtualization layer essentially schedules execution of virtual machines much like an operating system schedules execution of application programs, so that the virtual machines each execute within a complete and fully functional virtual hardware layer.

FIG. 5B illustrates a second type of virtualization. In FIG. 5B, the computer system 540 includes the same hardware layer 542 and software layer 544 as the hardware layer 402 shown in FIG. 4. Several application programs 546 and 548 are shown running in the execution environment provided by the operating system. In addition, a virtualization layer 550 is also provided, in computer 540, but, unlike the virtualization layer 504 discussed with reference to FIG. 5A, virtualization layer 550 is layered above the operating system 544, referred to as the "host OS," and uses the operating system interface to access operating-system-provided functionality as well as the hardware. The virtualization layer 550 comprises primarily a VMM and a hardware-like interface 552, similar to hardware-like interface 508 in FIG. 5A. The virtualization-layer/hardware-layer interface 552, equivalent to interface 416 in FIG. 4, provides an execution environment for a number of virtual machines 556-558, each including one or more application programs or other higher-level computational entities packaged together with a guest operating system.

In FIGS. 5A-B, the layers are somewhat simplified for clarity of illustration. For example, portions of the virtualization layer 550 may reside within the host-operating-system kernel, such as a specialized driver incorporated into the host operating system to facilitate hardware access by the virtualization layer.

It should be noted that virtual hardware layers, virtualization layers, and guest operating systems are all physical entities that are implemented by computer instructions stored in physical data-storage devices, including electronic memories, mass-storage devices, optical disks, magnetic disks, and other such devices. The term "virtual" does not, in any way, imply that virtual hardware layers, virtualization layers, and guest operating systems are abstract or intangible. Virtual hardware layers, virtualization layers, and guest operating systems execute on physical processors of physical computer systems and control operation of the physical computer systems, including operations that alter the physical states of physical devices, including electronic memories and mass-storage devices. They are as physical and tangible as any other component of a computer since, such as power supplies, controllers, processors, busses, and data-storage devices.

Figure 6:
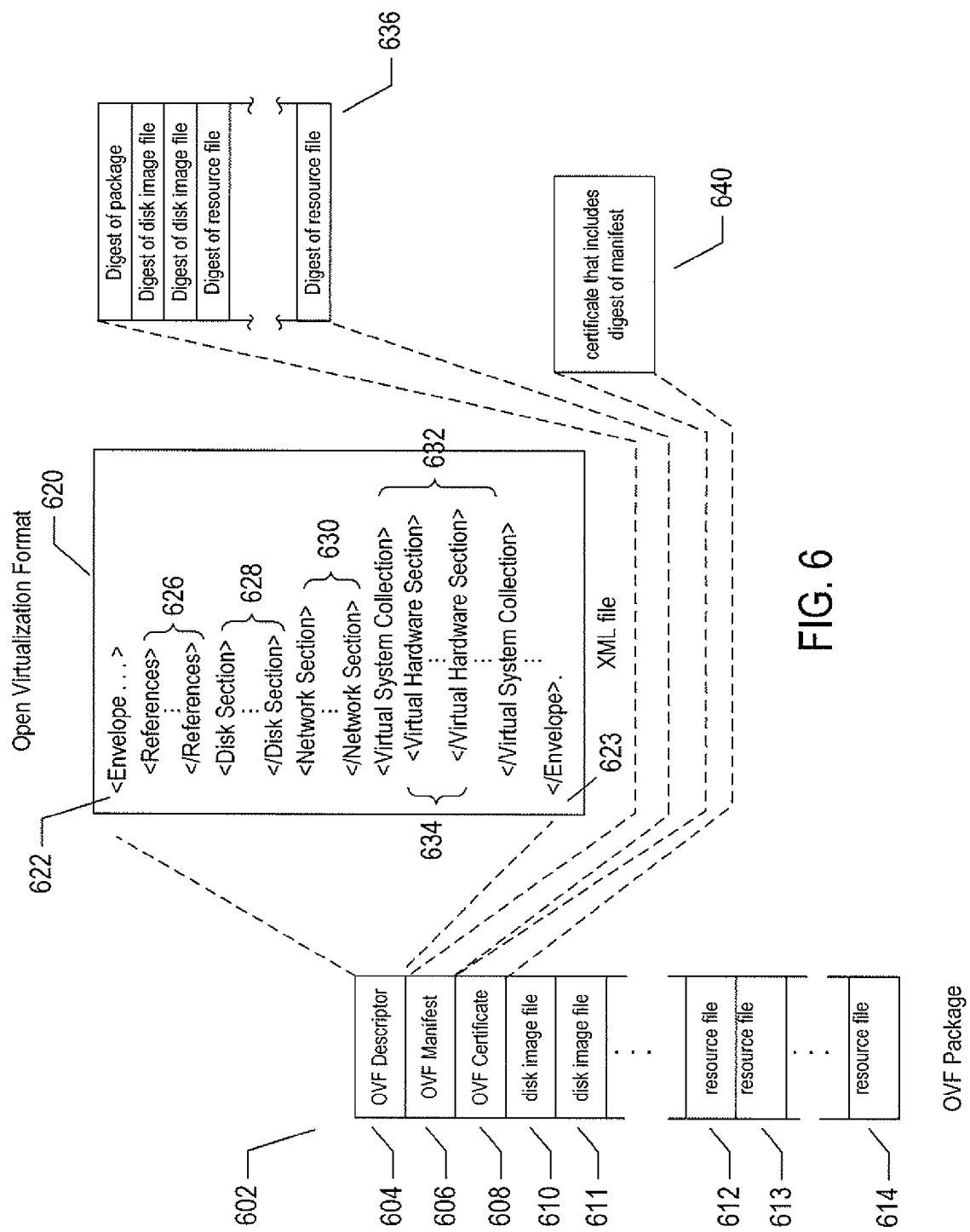
FIG. 6 illustrates an OVF package.

A virtual machine or virtual application, described below, is encapsulated within a data package for transmission, distribution, and loading into a virtual-execution environment. One public standard for virtual-machine encapsulation is referred to as the "open virtualization format" ("OVF"). The OVF standard specifies a format for digitally encoding a virtual machine within one or more data files. FIG. 6 illustrates an OVF package. An OVF package 602 includes an OVF descriptor 604, an OVF manifest 606, an OVF certificate 608, one or more disk-image files 610-611, and one or more resource files 612-614. The OVF package can be encoded and stored as a single file or as a set of files. The OVF descriptor 604 is an XML document 620 that includes a hierarchical set of elements, each demarcated by a beginning tag and an ending tag. The outermost, or highest-level, element is the envelope element, demarcated by tags 622 and 623. The next-level element includes a reference element 626 that includes references to all files that are part of the OVF package, a disk section 628 that contains meta information about all of the virtual disks included in the OVF package, a networks section 630 that includes meta information about all of the logical networks included in the OVF package, and a collection of virtual-machine configurations 632 which further includes hardware descriptions of each virtual machine 634. There are many additional hierarchical levels and elements within a typical OVF descriptor. The OVF descriptor is thus a self-describing, XML file that describes the contents of an OVF package. The OVF manifest 606 is a list of cryptographic-hash-function-generated digests 636 of the entire OVF package and of the various components of the OVF package. The OVF certificate 608 is an authentication certificate 640 that includes a digest of the manifest and that is cryptographically signed. Disk image files, such as disk image file 610, are digital encodings of the contents of virtual disks and resource files 612 are digitally encoded content, such as operating-system images. A virtual machine or a collection of virtual machines encapsulated together within a virtual application can thus be digitally encoded as one or more files within an OVF package that can be transmitted, distributed, and loaded using well-known tools for transmitting, distributing, and loading files. A virtual appliance is a software service that is delivered as a complete software stack installed within one or more virtual machines that is encoded within an OVF package.

Figure 7:
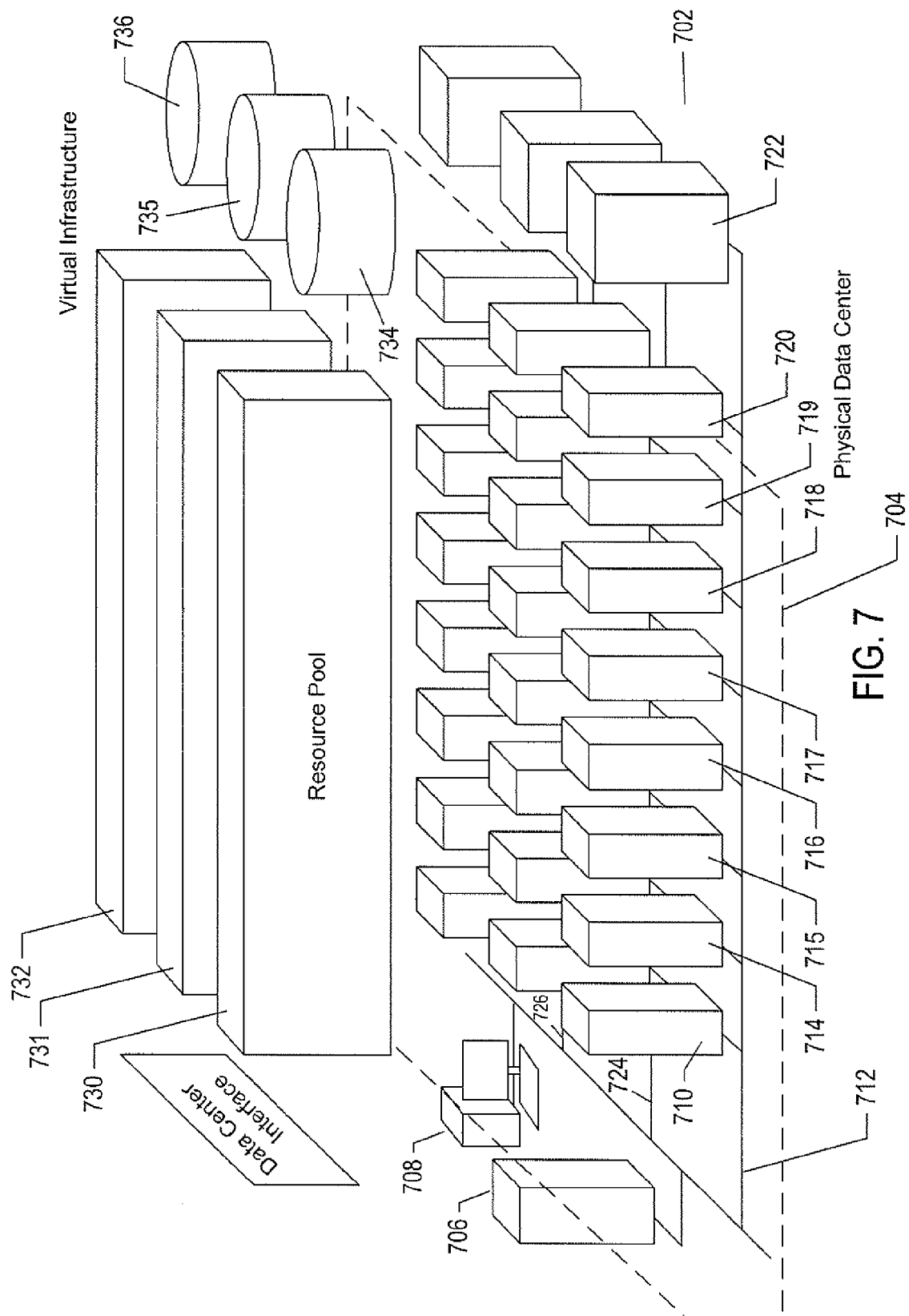
FIG. 7 illustrates virtual data centers provided as an abstraction of underlying physical-data-center hardware components.

The advent of virtual machines and virtual environments has alleviated many of the difficulties and challenges associated with traditional general-purpose computing. Machine and operating-system dependencies can be significantly reduced or entirely eliminated by packaging applications and operating systems together as virtual machines and virtual appliances that execute within virtual environments provided by virtualization layers running on many different types of computer hardware. A next level of abstraction, referred to as virtual data centers which are one example of a broader virtual-infrastructure category, provide a data-center interface to virtual data centers computationally constructed within physical data centers. FIG. 7 illustrates virtual data centers provided as an abstraction of underlying physical-data-center hardware components. In FIG. 7, a physical data center 702 is shown below a virtual-interface plane 704. The physical data center consists of a virtual-infrastructure management server ("VI management server") 706 and any of various different computers, such as PCs 708, on which a virtual-data-center management interface may be displayed to system administrators and other users. The physical data center additionally includes generally large numbers of server computers, such as server computer 710, that are coupled together by local area networks, such as local area network 712 that directly interconnects server computer 710 and 714-720 and a mass-storage array 722. The physical data center shown in FIG. 7 includes three local area networks 712, 724, and 726 that each directly interconnects a bank of eight servers and a mass-storage array. The individual server computers, such as server computer 710, each includes a virtualization layer and runs multiple virtual machines. Different physical data centers may include many different types of computers, networks, data-storage systems and devices connected according to many different types of connection topologies. The virtual-data-center abstraction layer 704, a logical abstraction layer shown by a plane in FIG. 7, abstracts the physical data center to a virtual data center comprising one or more resource pools, such as resource pools 730-732, one or more virtual data stores, such as virtual data stores 734-736, and one or more virtual networks. In certain implementations, the resource pools abstract banks of physical servers directly interconnected by a local area network.

The virtual-data-center management interface allows provisioning and launching of virtual machines with respect to resource pools, virtual data stores, and virtual networks, so that virtual-data-center administrators need not be concerned with the identities of physical-data-center components used to execute particular virtual machines. Furthermore, the VI management server includes functionality to migrate running virtual machines from one physical server to another in order to optimally or near optimally manage resource allocation, provide fault tolerance, and high availability by migrating virtual machines to most effectively utilize underlying physical hardware resources, to replace virtual machines disabled by physical hardware problems and failures, and to ensure that multiple virtual machines supporting a high-availability virtual appliance are executing on multiple physical computer systems so that the services provided by the virtual appliance are continuously accessible, even when one of the multiple virtual appliances becomes compute bound, data-access bound, suspends execution, or fails. Thus, the virtual data center layer of abstraction provides a virtual-data-center abstraction of physical data centers to simplify provisioning, launching, and maintenance of virtual machines and virtual appliances as well as to provide high-level, distributed functionalities that involve pooling the resources of individual physical servers and migrating virtual machines among physical servers to achieve load balancing, fault tolerance, and high availability.

Figure 8:
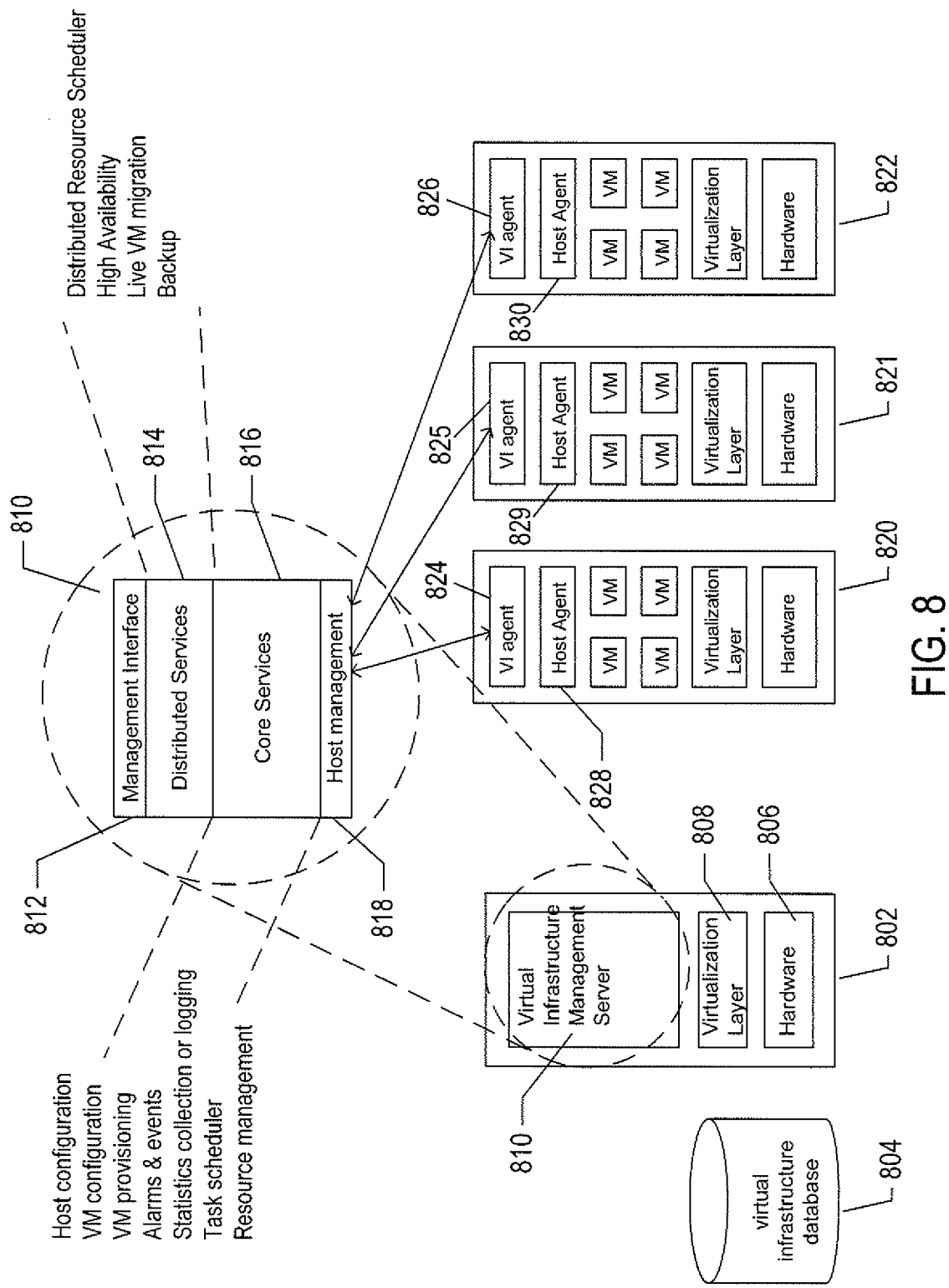
FIG. 8 illustrates virtual-machine components of a VI management server and physical servers of a physical data center above which a virtual-data-center interface is provided by the VI management server.

FIG. 8 illustrates virtual-machine components of a VI management server and physical servers of a physical data center above which a virtual-data-center interface is provided by the VI management server. The VI management server 802 and a virtual-data-center database 804 comprise the physical components of the management component of the virtual data center. The VI management server 802 includes a hardware layer 806 and virtualization layer 808, and runs a virtual-data-center management server virtual machine 810 above the virtualization layer. Although shown as a single server in FIG. 8, the VI management server ("VI management server") may include two or more physical server computers that support multiple VI management server virtual appliances. The virtual machine 810 includes a management-interface component 812, distributed services 814, core services 816, and a host-management interface 818. The management interface is accessed from any of various computers, such as the PC 708 shown in FIG. 7. The management interface allows the virtual-data-center administrator to configure a virtual data center, provision virtual machines, collect statistics and view log files for the virtual data center, and to carry out other, similar management tasks. The host-management interface 818 interfaces to virtual-data-center agents 824, 825, and 826 that execute as virtual machines within each of the physical servers of the physical data center that is abstracted to a virtual data center by the VI management server.

The distributed services 814 include a distributed-resource scheduler that assigns virtual machines to execute within particular physical servers and that migrates virtual machines in order to most effectively make use of computational bandwidths, data-storage capacities, and network capacities of the physical data center. The distributed services further include a high-availability service that replicates and migrates virtual machines in order to ensure that virtual machines continue to execute despite problems and failures experienced by physical hardware components. The distributed services also include a live-virtual-machine migration service that temporarily halts execution of a virtual machine, encapsulates the virtual machine in an OVF package, transmits the OVF package to a different physical server, and restarts the virtual machine on the different physical server from a virtual-machine state recorded when execution of the virtual machine was halted. The distributed services also include a distributed backup service that provides centralized virtual-machine backup and restore.

The core services provided by the VI management server include host configuration, virtual-machine configuration, virtual-machine provisioning, generation of virtual-data-center alarms and events, ongoing event logging and statistics collection, a task scheduler, and a resource-management module. Each physical server 820-822 also includes a host-agent virtual machine 828-830 through which the virtualization layer can be accessed via a virtual-infrastructure application programming interface ("API"). This interface allows a remote administrator or user to manage an individual server through the infrastructure API. The virtual-data-center agents 824-826 access virtualization-layer server information through the host agents. The virtual-data-center agents are primarily responsible for offloading certain of the virtual-data-center management server functions specific to a particular physical server to that physical server. The virtual-data-center agents relay and enforce resource allocations made by the VI management server, relay virtual-machine provisioning and configuration-change commands to host agents, monitor and collect performance statistics, alarms, and events communicated to the virtual-data-center agents by the local host agents through the interface API, and to carry out other, similar virtual-data-management tasks.

The virtual-data-center abstraction provides a convenient and efficient level of abstraction for exposing the computational resources of a cloud-computing facility to cloud-computing-infrastructure users. A cloud-director management server exposes virtual resources of a cloud-computing facility to cloud-computing-infrastructure users. In addition, the cloud director introduces a multi-tenancy layer of abstraction, which partitions virtual data centers ("VDCs") into tenant-associated VDCs that can each be allocated to a particular individual tenant or tenant organization, both referred to as a "tenant." A given tenant can be provided one or more tenant-associated VDCs by a cloud director managing the multi-tenancy layer of abstraction within a cloud-computing facility. The cloud services interface (308 in FIG. 3) exposes a virtual-data-center management interface that abstracts the physical data center.

Figure 9:
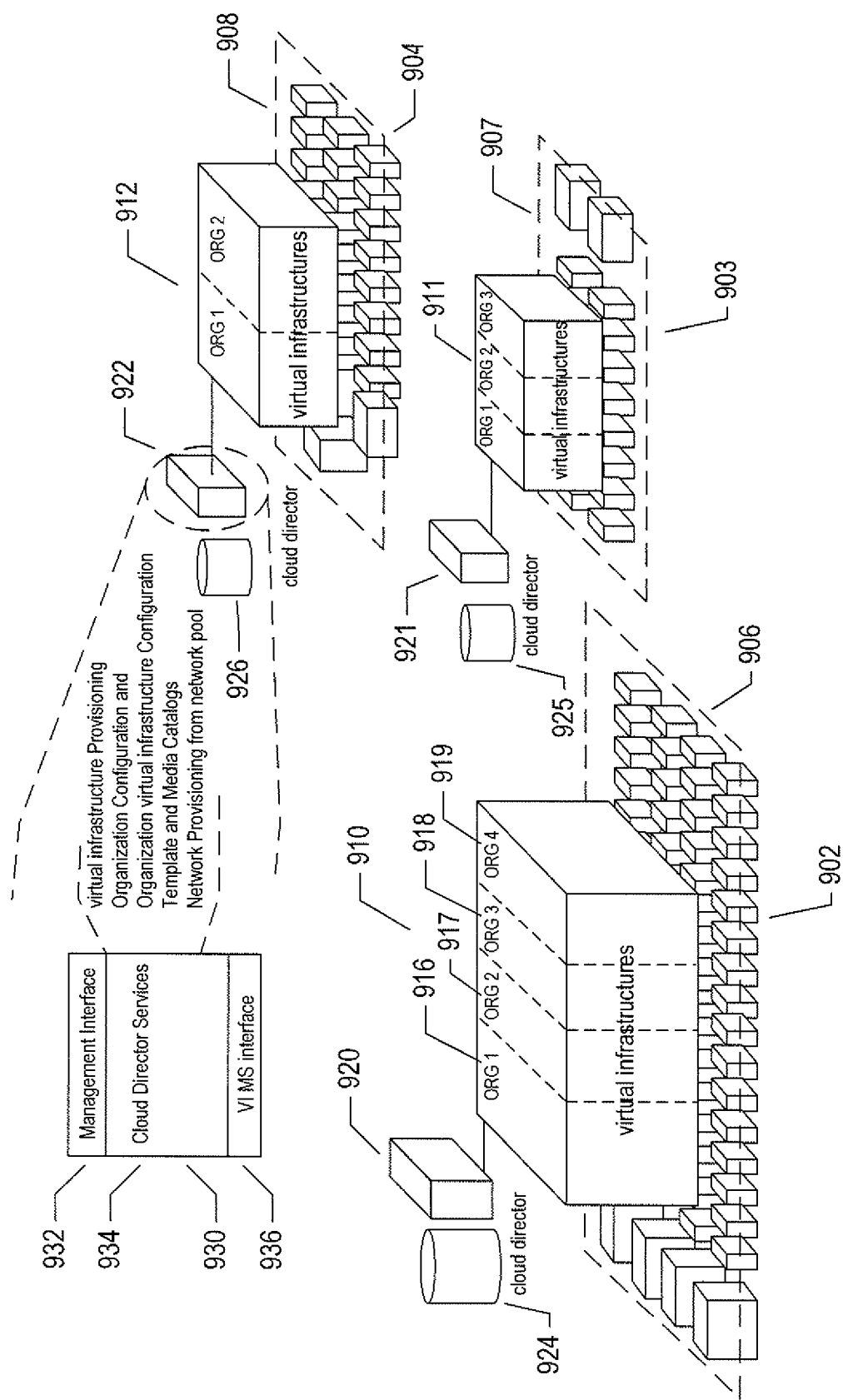
FIG. 9 illustrates a cloud-director level of abstraction.

FIG. 9 illustrates a cloud-director level of abstraction. In FIG. 9, three different physical data centers 902-904 are shown below planes representing the cloud-director layer of abstraction 906-908. Above the planes representing the cloud-director level of abstraction, multi-tenant virtual data centers 910-912 are shown. The resources of these multi-tenant virtual data centers are securely partitioned in order to provide secure virtual data centers to multiple tenants, or cloud-services-accessing organizations. For example, a cloud-services-provider virtual data center 910 is partitioned into four different tenant-associated virtual-data centers within a multi-tenant virtual data center for four different tenants 916-919. Each multi-tenant virtual data center is managed by a cloud director comprising one or more cloud-director servers 920-922 and associated cloud-director databases 924-926. Each cloud-director server or servers runs a cloud-director virtual appliance 930 that includes a cloud-director management interface 932, a set of cloud-director services 934, and a virtual-data-center management-server interface 936. The cloud-director services include an interface and tools for provisioning multi-tenant virtual data center virtual data centers on behalf of tenants, tools and interfaces for configuring and managing tenant organizations, tools and services for organization of virtual data centers and tenant-associated virtual data centers within the multi-tenant virtual data center, services associated with template and media catalogs, and provisioning of virtualization networks from a network pool. Templates are virtual machines that each contains an OS and/or one or more virtual machines containing applications. A template may include much of the detailed contents of virtual machines and virtual appliances that are encoded within OVF packages, so that the task of configuring a virtual machine or virtual appliance is significantly simplified, requiring only deployment of one OVF package. These templates are stored in catalogs within a tenant's virtual-data center. These catalogs are used for developing and staging new virtual appliances and published catalogs are used for sharing templates in virtual appliances across organizations. Catalogs may include OS images and other information relevant to construction, distribution, and provisioning of virtual appliances.

Considering FIGS. 7 and 9, the VI management server and cloud-director layers of abstraction can be seen, as discussed above, to facilitate employment of the virtual-data-center concept within private and public clouds. However, this level of abstraction does not fully facilitate aggregation of single-tenant and multi-tenant virtual data centers into heterogeneous or homogeneous aggregations of cloud-computing facilities.

Figure 10:
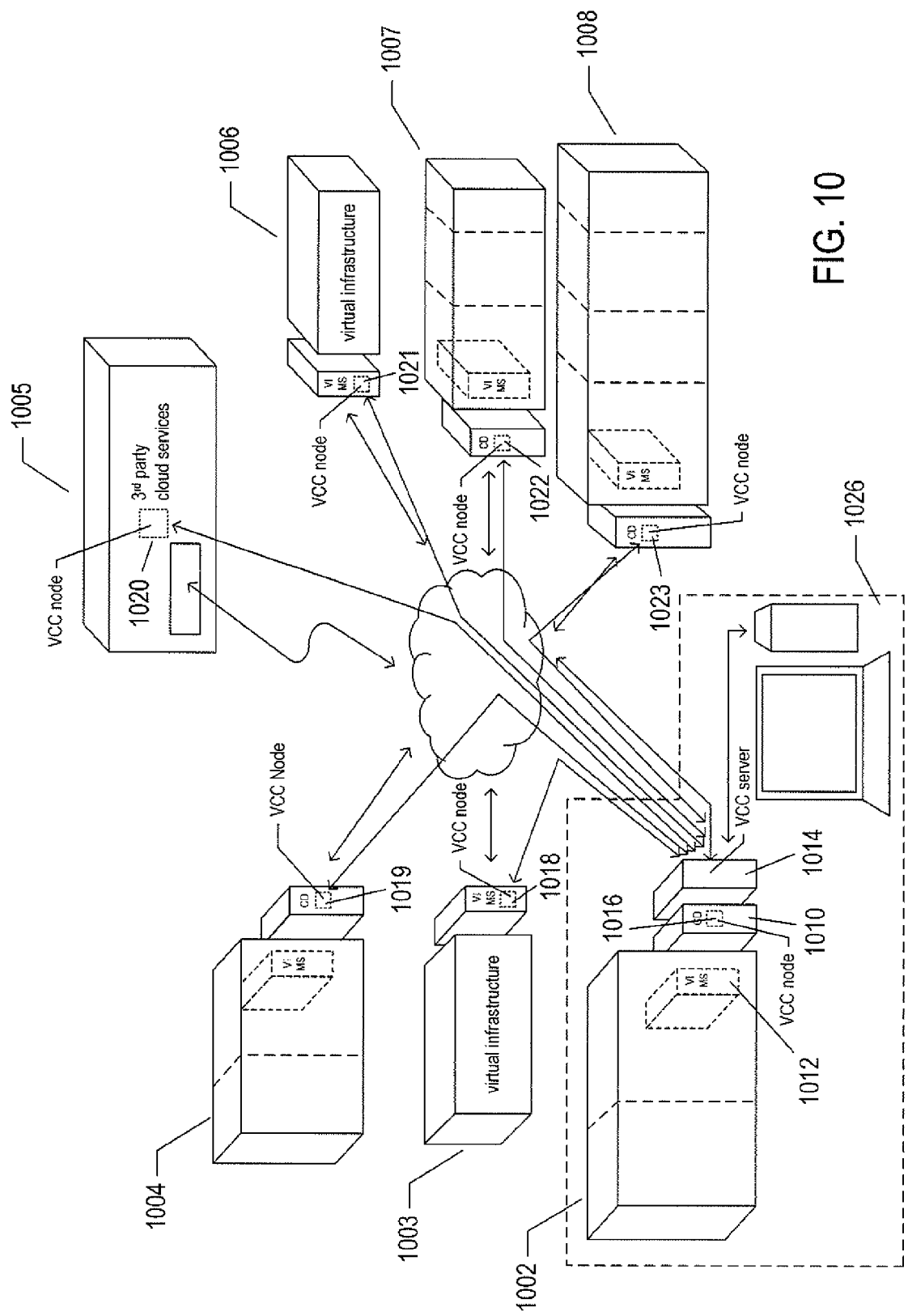
FIG. 10 illustrates virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds.

FIG. 10 illustrates virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds. VMware vCloud™ VCC servers and nodes are one example of VCC server and nodes. In FIG. 10, seven different cloud-computing facilities are illustrated 1002-1008. Cloud-computing facility 1002 is a private multi-tenant cloud with a cloud director 1010 that interfaces to a VI management server 1012 to provide a multi-tenant private cloud comprising multiple tenant-associated virtual data centers. The remaining cloud-computing facilities 1003-1008 may be either public or private cloud-computing facilities and may be single-tenant virtual data centers, such as virtual data centers 1003 and 1006, multi-tenant virtual data centers, such as multi-tenant virtual data centers 1004 and 1007-1008, or any of various different kinds of third-party cloud-services facilities, such as third-party cloud-services facility 1005. An additional component, the VCC server 1014, acting as a controller is included in the private cloud-computing facility 1002 and interfaces to a VCC node 1016 that runs as a virtual appliance within the cloud director 1010. A VCC server may also run as a virtual appliance within a VI management server that manages a single-tenant private cloud. The VCC server 1014 additionally interfaces, through the Internet, to VCC node virtual appliances executing within remote VI management servers, remote cloud directors, or within the third-party cloud services 1018-1023. The VCC server provides a VCC server interface that can be displayed on a local or remote terminal, PC, or other computer system 1026 to allow a cloud-aggregation administrator or other user to access VCC-server-provided aggregate-cloud distributed services. In general, the cloud-computing facilities that together form a multiple-cloud-computing aggregation through distributed services provided by the VCC server and VCC nodes are geographically and operationally distinct.

Figure 11:
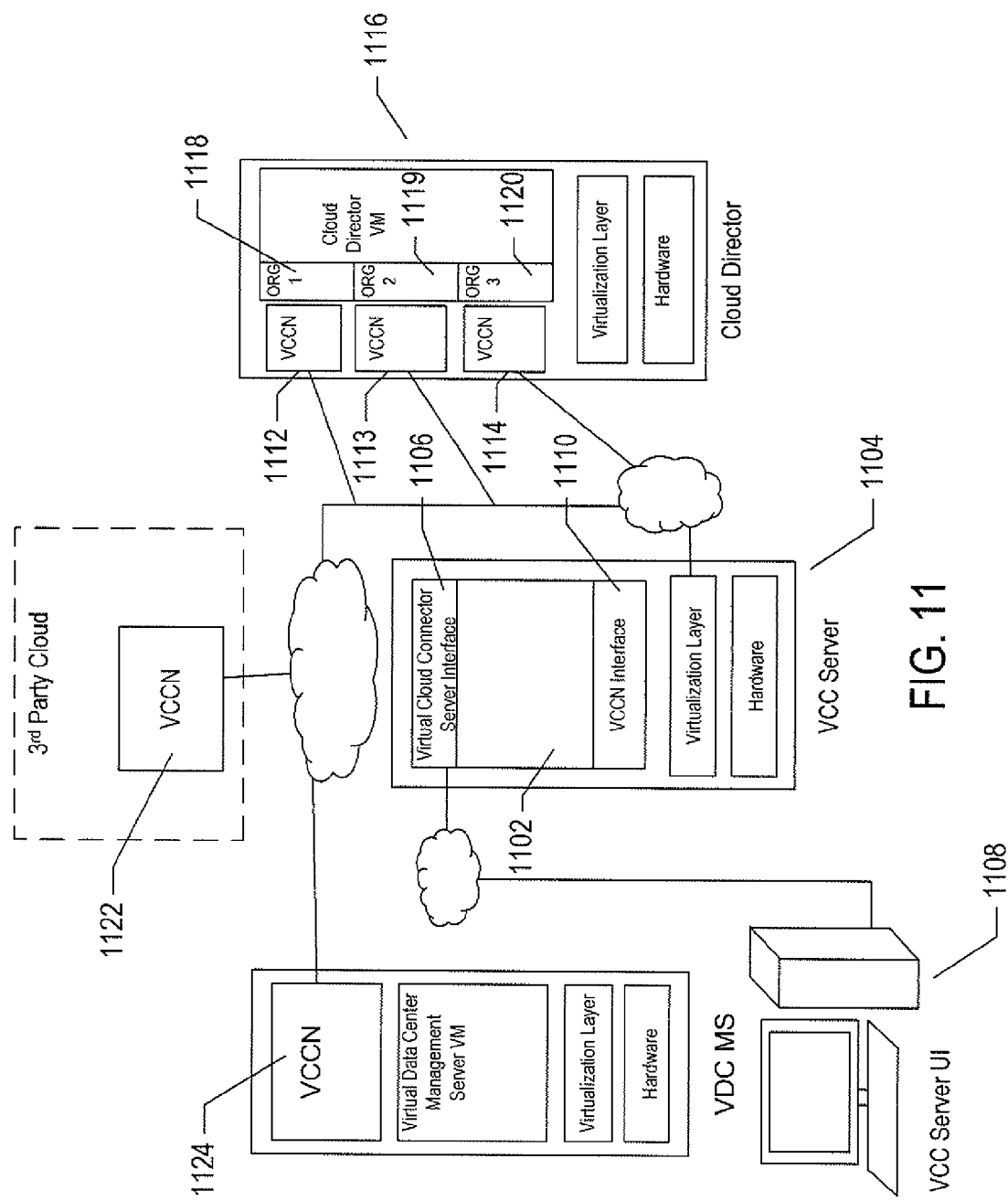
FIG. 11 illustrates the VCC server and VCC nodes in a slightly different fashion than the VCC server and VCC nodes are illustrated in FIG. 10.

FIG. 11 illustrates the VCC server and VCC nodes in a slightly different fashion than the VCC server and VCC nodes are illustrated in FIG. 10. In FIG. 11, the VCC server virtual machine 1102 is shown executing within a VCC server 1104. The VCC-server virtual machine includes a VCC-server interface 1106 through which a terminal, PC, or other computing device 1108 interfaces to the VCC server. The VCC server, upon request, displays a VCC-server user interface on the computing device 1108 to allow a cloud-aggregate administrator or other user to access VCC-server-provided functionality. The VCC-server virtual machine additionally includes a VCC-node interface 1108 through which the VCC server interfaces to VCC-node virtual appliances that execute within VDC management servers, cloud directors, and third-party cloud-computing facilities. As shown in FIG. 11, in one implementation, a VCC-node virtual machine is associated with each organization configured within and supported by a cloud director. Thus, VCC nodes 1112-1114 execute as virtual appliances within cloud director 1116 in association with organizations 1118-1120, respectively. FIG. 11 shows a VCC-node virtual machine 1122 executing within a third-party cloud-computing facility and a VCC-node virtual machine 1124 executing within a VDC management server. The VCC server, including the services provided by the VCC-server virtual machine 1102, in conjunction with the VCC-node virtual machines running within remote VDC management servers, cloud directors, and within third-party cloud-computing facilities, together provide functionality distributed among the cloud-computing-facility components of either heterogeneous or homogeneous cloud-computing aggregates.

Figure 12:
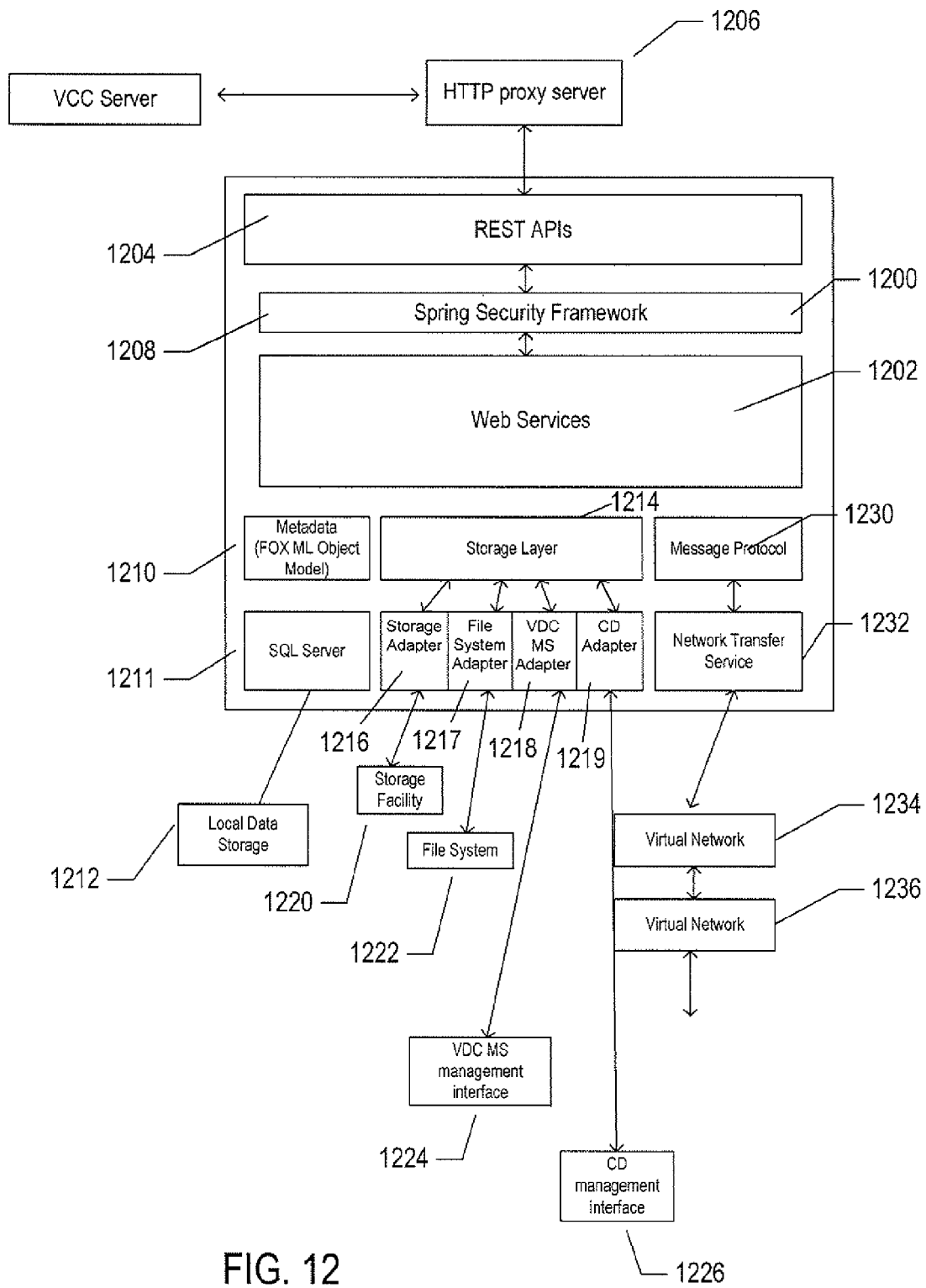
FIG. 12 illustrates one implementation of a VCC node.

FIG. 12 illustrates one implementation of a VCC node. The VCC node 1200 is a web service that executes within an Apache/Tomcat container that runs as a virtual appliance within a cloud director, VDC management server, or third-party cloud-computing server. The VCC node exposes web services 1202 to a remote VCC server via REST APIs accessed through the representational state transfer ("REST") protocol 1204 via a hypertext transfer protocol ("HTTP") proxy server 1206. The REST protocol uses HTTP requests to post data and requests for services, read data and receive service-generated responses, and delete data. The web services 1202 comprise a set of internal functions that are called to execute the REST APIs 1204. Authorization services are provided by a spring security layer 1208. The internal functions that implement the web services exposed by the REST APIs employ a metadata/object-store layer implemented using an SQL Server database 1210-1212, a storage layer 1214 with adapters 1216-1219 provides access to data stores 1220, file systems 1222, the virtual-data-center management-server management interface 1224, and the cloud-director management interface 1226. These adapters may additional include adapters to $3^{rd}$-party cloud management services, interfaces, and systems. The internal functions that implement the web services may also access a message protocol 1230 and network transfer services 1232 that allow for transfer of OVF packages and other files securely between VCC nodes via virtual networks 1234 that virtualize underlying physical networks 1236. The message protocol 1230 and network transfer services 1232 together provide for secure data transfer, multipart messaging, and checkpoint-restart data transfer that allows failed data transfers to be restarted from most recent checkpoints, rather than having to be entirely retransmitted.

The VCC node, packaged inside an OVF container, is available to the cloud-director servers and VDC management servers for deployment as a virtual appliance. The VCC node is deployed as a virtual appliance, containing one virtual machine in this case, and is launched within the cloud-director servers and VDC management servers in the same fashion as any other virtual machine is installed and launched in those servers. When the VCC node starts up, a cloud administrator accesses an administrative interface offered as one of the VCC node's web services. This administrative interface, along with a similar administrative interface provided as a web service by the VCC server running within a VDC management server/cloud-director, allows an administrator of the cloud or organization in which the VCC node is being installed to configure and register the VCC node.

Figure 13:
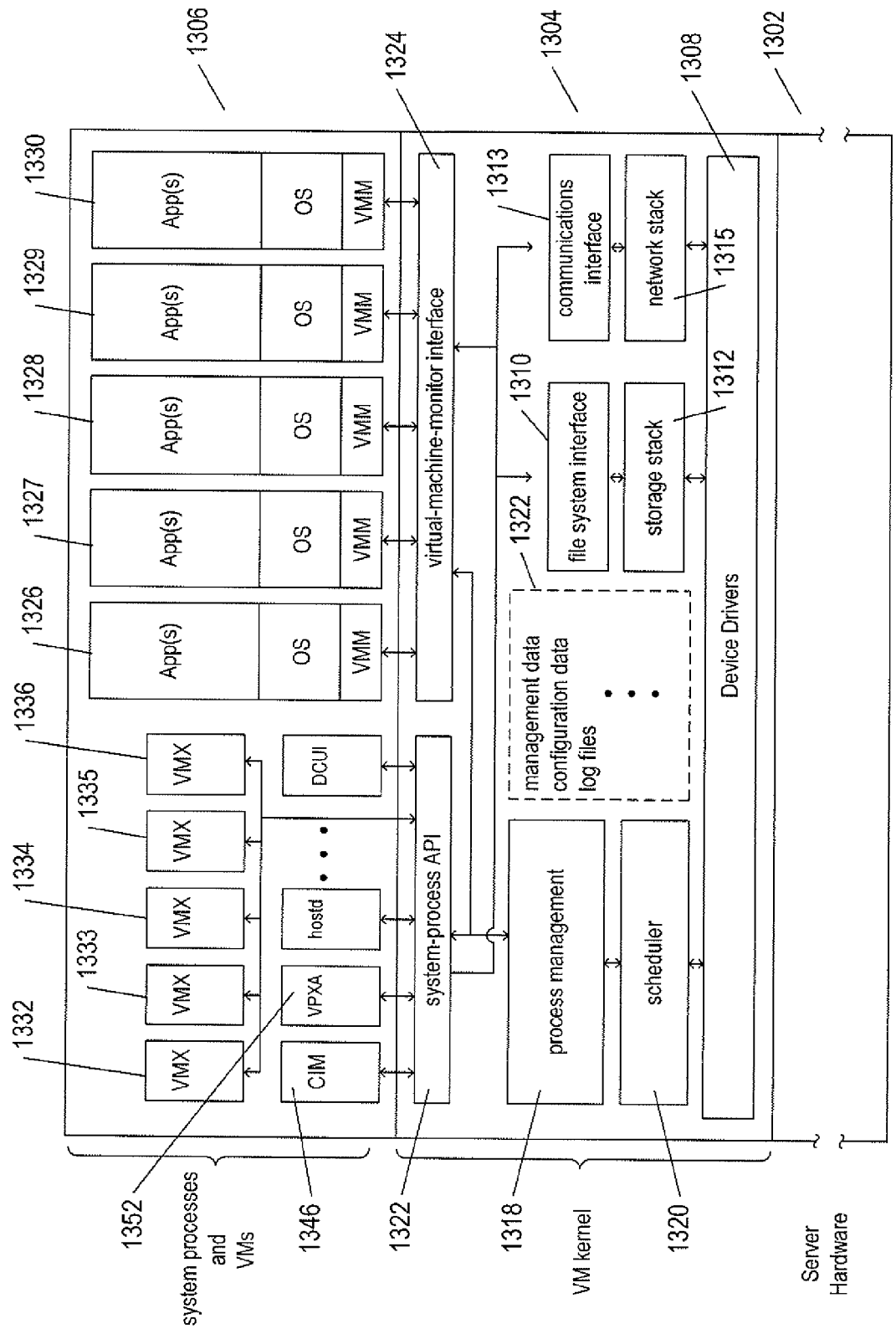
FIG. 13 provides additional details with regard to the internal components of a server computer, or host system, within a virtual data center.

Host-Gateway-Facilitated Aggregation of Host Clusters into a Higher-Level Distributed Computing System FIG. 13 provides additional details with regard to the internal components of one implementation of a server computer, or host system, within a virtual data center. As discussed above, a host computer includes a hardware layer 1302, a virtualization layer 1304, and a system processes and virtual-machine layer 1306. The virtualization layer 1304 comprises, in the implementation shown in FIG. 13, a VM kernel that provides functionality similar to that provided by a traditional operating system. The VM kernel includes device drivers 1308 that interface directly with hardware components of the hardware layer 1302. The VM kernel provides a file system that includes a file-system interface 1310 and a layered file-system implementation referred to as a "storage stack" 1312. Similarly, the VM kernel provides a communications networking interface 1313, an underlying, layered communications and networking implementation referred to as a "network stack" 1315. Like an operating system, the VM kernel provides process management for managing concurrent, and, in multi-processor systems, simultaneous execution of multiple different processes 1318 and a scheduler 1320 that schedules access by various computational entities, including virtual machines and system processes, to hardware resources. The VM kernel stores a variety of different types of management data, configuration data, log files, and other such operational data 1322 in the file system 1310 and 1312. The VM kernel provides a system-process interface 1322 to support execution of a variety of different system processes and a virtual-machine-monitor interface 1324 that provides an execution environment for multiple virtual machines 1326-1330. The system processes that run within an execution environment provided by the system-process interface 1322 include VMX processes 1332-1336, each associated with a virtual-machine monitor 1338-1342. In addition, the system processes include a common-information model ("CIM") process 1346 that enables hardware-level management from remote applications and a direct-console user interface ("DCUI") 1348 that provides a configuration and management interface accessible through a host console. A hostd process 1350 provides a programmatic interface to the VM kernel and provides functionality such as user authentication, user authorization, and creation and management of local users. A VPXA process 1352 is an agent that uses a proprietary protocol to connect a VI management server with the hostd process and provides various types of functionalities, including a heartbeat and host-sync facilities, discussed below. In addition, a host system may include many additional agents and processes, including a high-availability agent, a syslog daemon, various storage-system and networking-related processes, and other processes involved in the operation and operational management of the host system.

Figure 14:
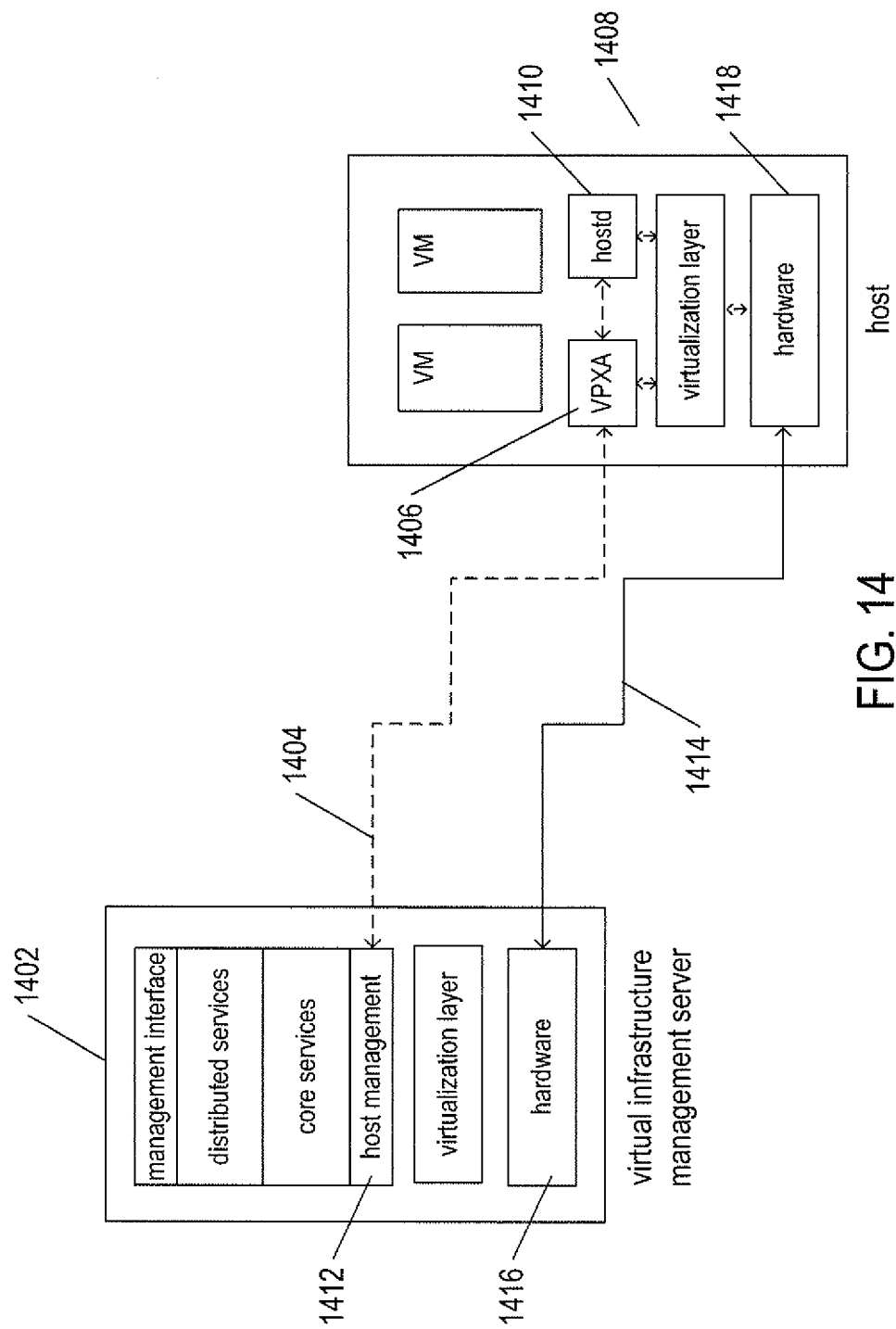
FIG. 14 illustrates communications between a VI management server and a host computer managed by the VI management server.

FIG. 14 illustrates communications between a VI management server and a host computer managed by the VI management server. In FIG. 14, the VI management server 1402 logically interfaces, as represented by dashed arrow 1404, to the VPXA agent or process 1406 within the host system 1408 in order to access management functionality provided both by the VPXA process 1406 as well as by the hostd process 1410. Of course, the logical communications between the host-management interface 1412 within the management application of the VI management server and the VPXA agent 1406 is implemented above an actual hardware interconnection 1414 between the hardware layers 1416 and 1418 of the VI management server and host system, respectively, generally involving local networking hardware and, in many cases, larger-scale communications infrastructures. Using the proprietary communications protocol provided by the host-management interface 1412 and VPXA agent 1406, the VI management server accesses a variety of different types of management functionality that allows the VI management server to configure, provision, power on, and power off virtual machines, move virtual machines among host systems, collect configuration information and operational statistics from the host system, configure various devices, system processes, and other entities within the host server, access information stored by the host server within the VM kernel file system, and many other host management facilities.

Figure 15A:
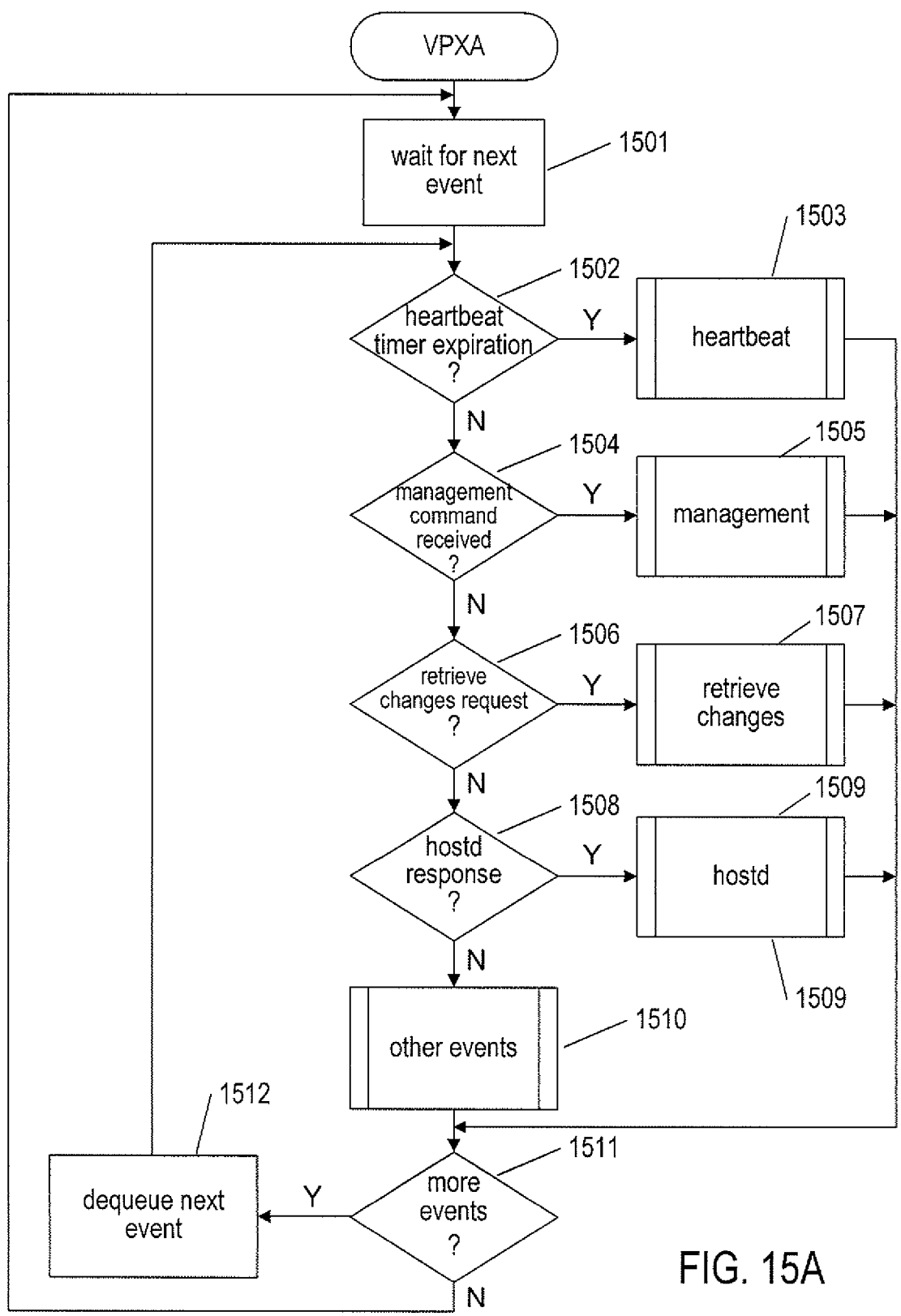
FIGS. 15A-G illustrate, using control-flow diagrams, communications between the VI management server and host server.

FIGS. 15A-G illustrate, using control-flow diagrams, communications between the VI management server and host server. FIG. 15A shows an event loop that continuously executes within the VPXA agent in order to respond to events, including timer expirations and messages received from the VI management server. In step 1501, the VPXA event loop waits for a next event to occur. When a next event occurs, then the type of event is determined, in a subsequent series of conditional blocks. Once determined, the event is handled by a call to an event handler. When, for example, the event is a heartbeat-timer expiration, as determined in step 1502, then a heartbeat handler is called in step 1503. When a management command is received from the VI management server, as determined in step 1504, then a management-command handler is called in step 1505. When a retrieve-changes request is received in step 1506, then a retrieve-changes handler is called in step 1507. The retrieve-changes request is part of the host-sync operation, in which, as a result of a heartbeat message, a VI management server determines that the configuration of a host has changed and seeks the configurations for local storage by issuing a retrieve-changes request. When a response from the hostd process is received, as determined in step 1508, then a hostd handler is called in step 1509. A default handler 1510 is shown in FIG. 15A that handles other types of events that occur with respect to the VPXA agent. When, after handling the most recently occurred event, another event has been received and queued to an input event queue, as determined in step 1511, then a next event is dequeued from the input queue, in step 1512, and control returns to step 1502. Otherwise, control returns to step 1501 where the VPXA event loop waits for a next event to occur.

Figure 15B:
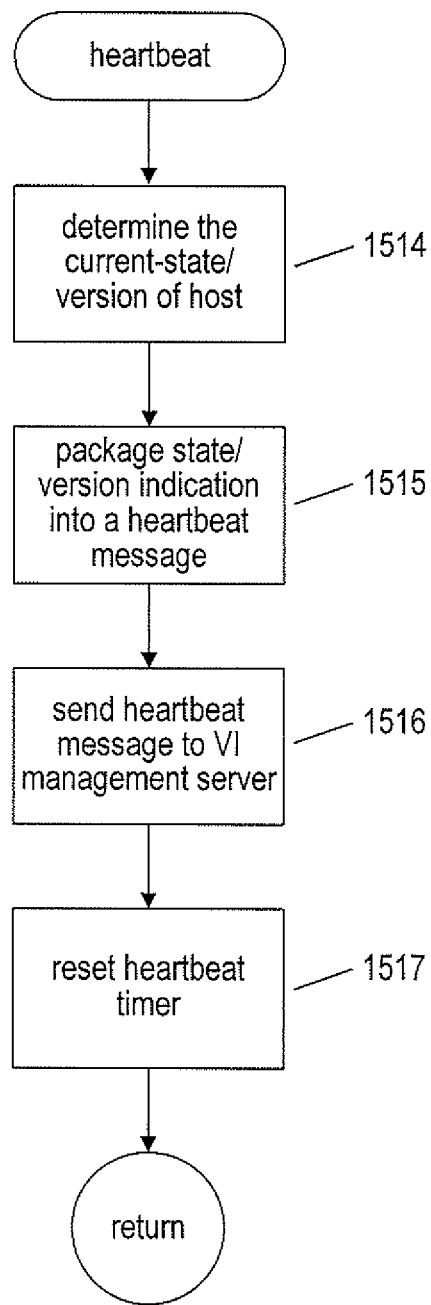

FIG. 15B illustrates the heartbeat handler called in step 1503 of FIG. 15A. In step 1514, the heartbeat handler determines a current state/version that represents the current operational status of the host server. The state/version indication is, in one implementation, an alphanumeric symbol string or a series of one or more symbol strings and floating-point numbers. The state/version indication is of sufficient length, and therefore has a sufficient number of different possible values, to uniquely assign a state/version indication value to each significant operational state of the host server system. In step 1515, the heartbeat handler packages the state/version indication into a heartbeat message which, in step 1516, the handler sends to the VI management server via the logical communications path between the host-management interface within the VI management server and the VPXA agent within the host server. Finally, in step 1517, the heartbeat handle resets the heartbeat timer in order to specify the time at which a next heartbeat message is sent to the VI management server. The heartbeat message is provided by the VPXA agent to allow the VI management server to track and monitor the operational status of host servers managed by the VI management server and to quickly recognize a host-server failure in order to restart VMs that were executing on the failed host server on other host servers.

Figure 15C:
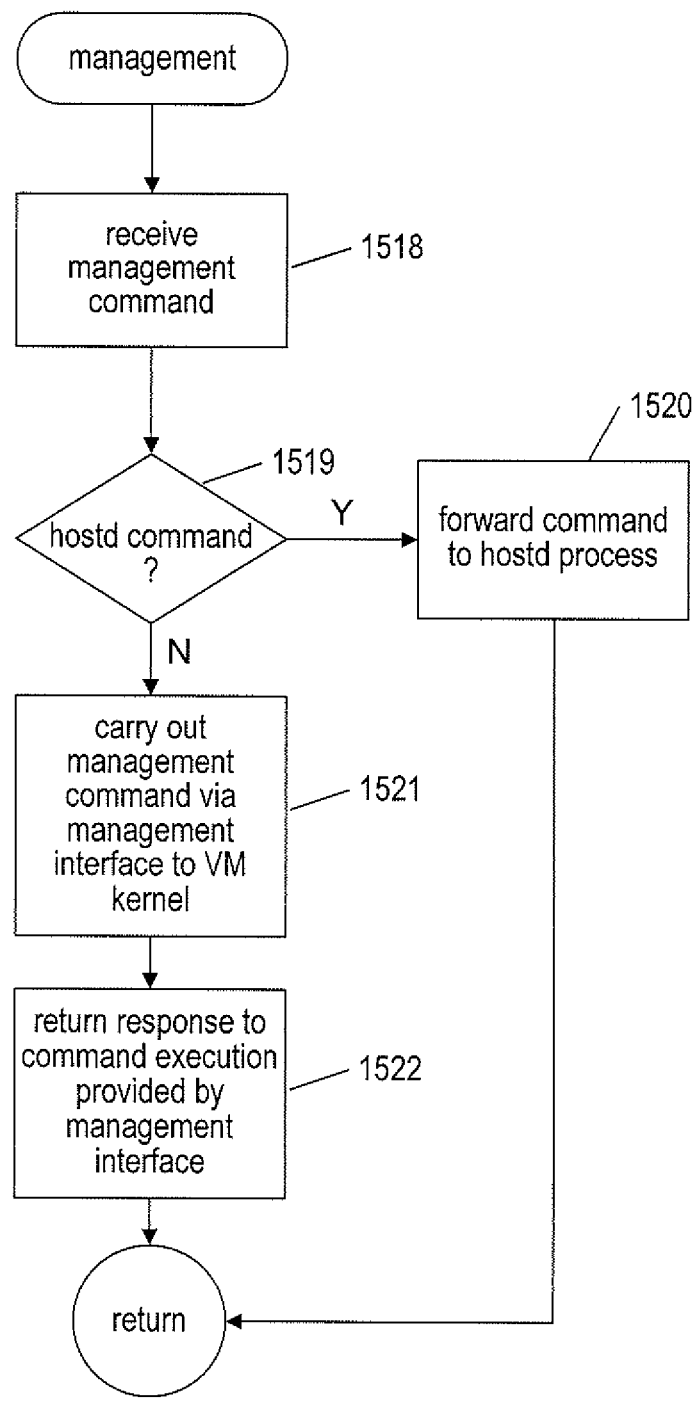

FIG. 15C illustrates the management handler called in step 1505 of FIG. 15A. In step 1518, the management handler receives the management command that was received by the VPXA agent from the VI management server. When the management command is a management command directed to the hostd process, as determined in step 1519, the management command is forwarded to the hostd process for execution, in step 1520. When the hostd process finishes executing the command, a hostd response is returned to the VPXA agent and handled by a hostd handler, called in step 1509 of FIG. 15A. Otherwise, in step 1521, the management handler accesses a management interface provided by the VM kernel to carry out the management command on behalf of the VI management server. In step 1522, the response from the management interface of the VM kernel is received and returned to the VI management server. In certain cases, although not shown in FIGS. 15A-G, the management handler may terminate after submitting the management command to the VM kernel management interface, with the VM kernel management interface subsequently generating an event for command completion that is handled by a separate event handler, just as the hostd event handler handles responses from the hostd process.

Figures 15D, 15E:
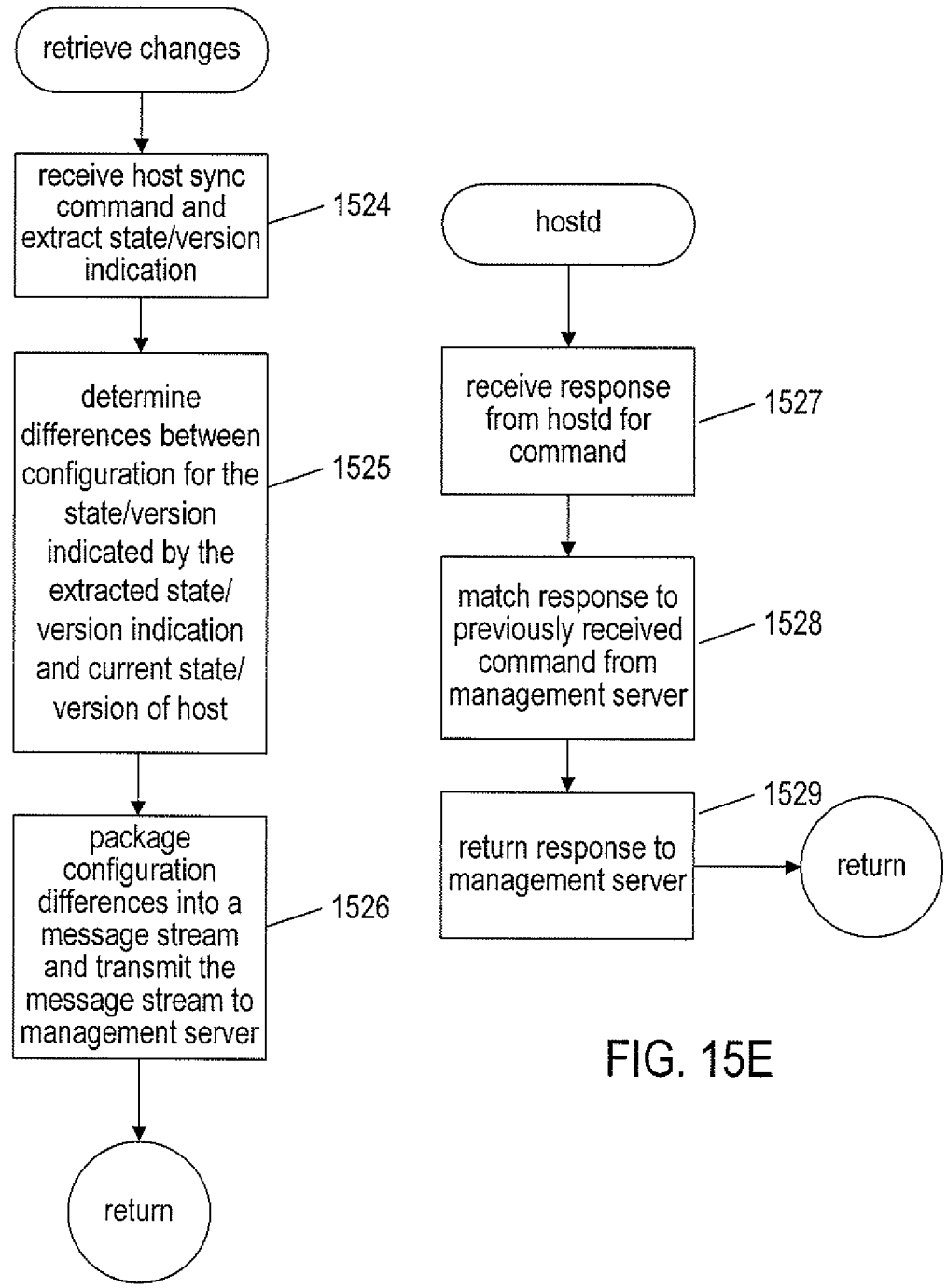

FIG. 15D shows the retrieve-changes handler called in step 1507 of FIG. 15D. In step 1524, the retrieve-changes handler receives a retrieve-changes command received by the VPXA agent from the VI management server and extracts a state/version indication from the retrieve-changes command. This is the state/version indication which the VI management server considers to be the current state/version of the host server. However, because a different state/version indication was returned by the VPXA agent in a previous heartbeat message, the VI management server has requested the retrieve-changes operation in order to obtain updated status and configuration information for the host server. In step 1525, the retrieve-changes handler determines the differences between the current configuration and operational status of the host server and the configuration and operational status that the host server had when the extracted state/version indication was returned to the VI management server. These configuration differences are packaged into a message stream, transmission of which is initiated in step 1526. One of the significant motivations for creation of the VPXA agent and proprietary protocol by which the VPXA agent communicates with the host-management interface within the VI management server is that the heartbeat messages and host sync operation provide more efficient monitoring and configuration-change information exchange between the VI management server and host servers than a direct interconnection between the VI management server and the hostd process.

FIG. 15E illustrates the hostd handler called in step 1509 of FIG. 15A. In step 1527, the hostd handler receives a response to a command executed by the hostd process on behalf of the VI management server. In step 1528, the VPXA agent matches the received response to a previously received management command from the VI management server and then, in step 1529, returns the received response from the hostd process to the VI management server in the context of the previously received command from the VI management server.

Figure 15F:
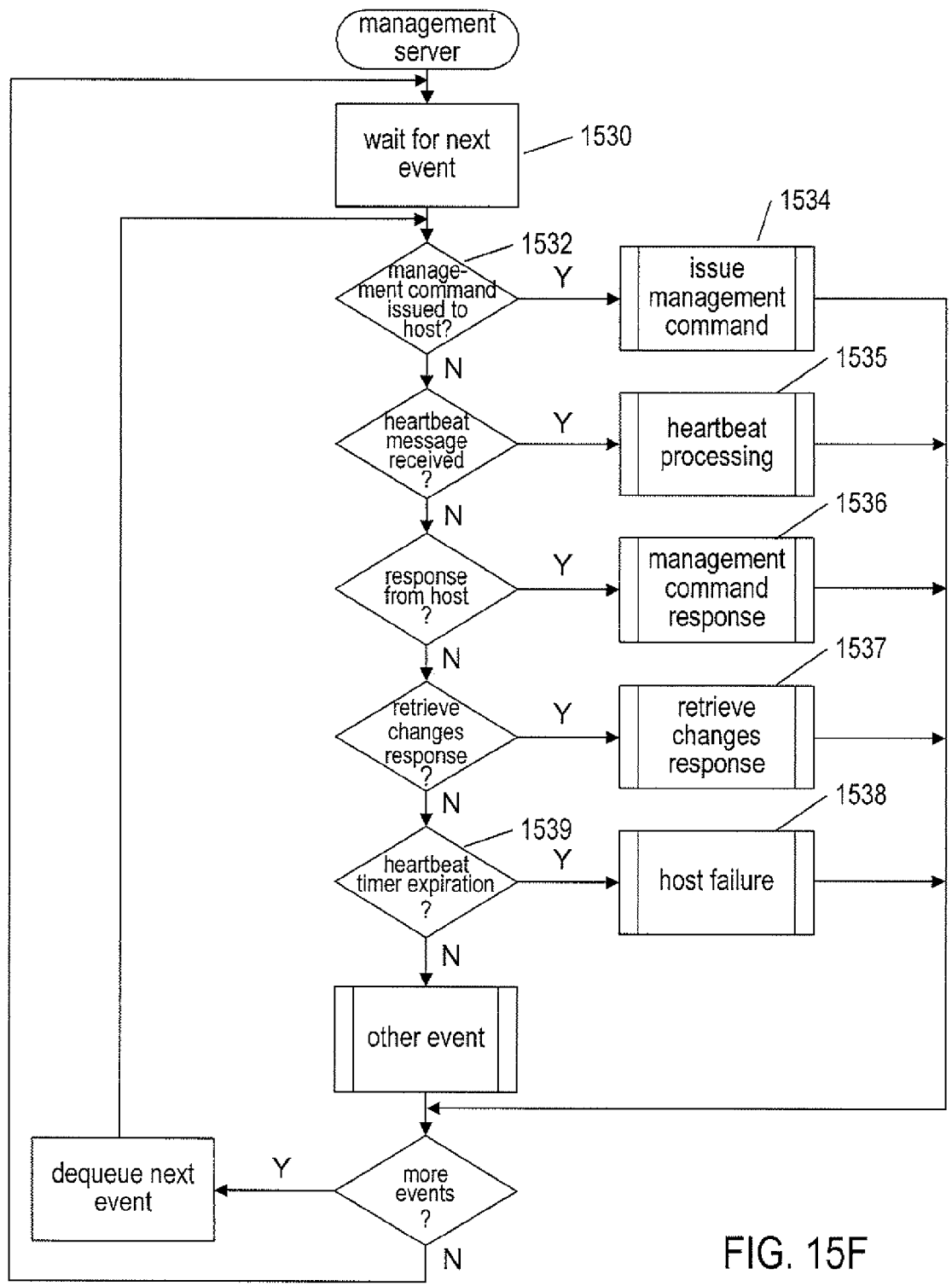

FIG. 15F shows an event loop that runs within the management process of the VI management server that provides the host-management interface that communicates with the VPXA agents and host servers managed by the VI management server. The event loop shown in FIG. 15F is similar to the event loop shown in FIG. 15A for the VPXA agent. The management-server event loop waits for a next event to occur in step 1530. Each different type of event, determined by a sequence of conditional steps, such as conditional step 1532, results in a call to a corresponding handler, as in the event loop discussed above with reference to FIG. 15A. Calls to handlers explicitly shown in FIG. 15F include a call to a handler that issues management commands to host servers 1534, a heartbeat-message-processing handler 1535, a handler for received responses to issued management commands 1536, a handler for receiving processing responses to retrieve-changes commands 1537, and a host-failure handler 1538 that is called to handle host failure events detected by expiration of a heartbeat timer associated with the host, identified in conditional step 1539. In the interest of brevity, only the heartbeat-processing handler 1535 is further discussed.

Figure 15G:
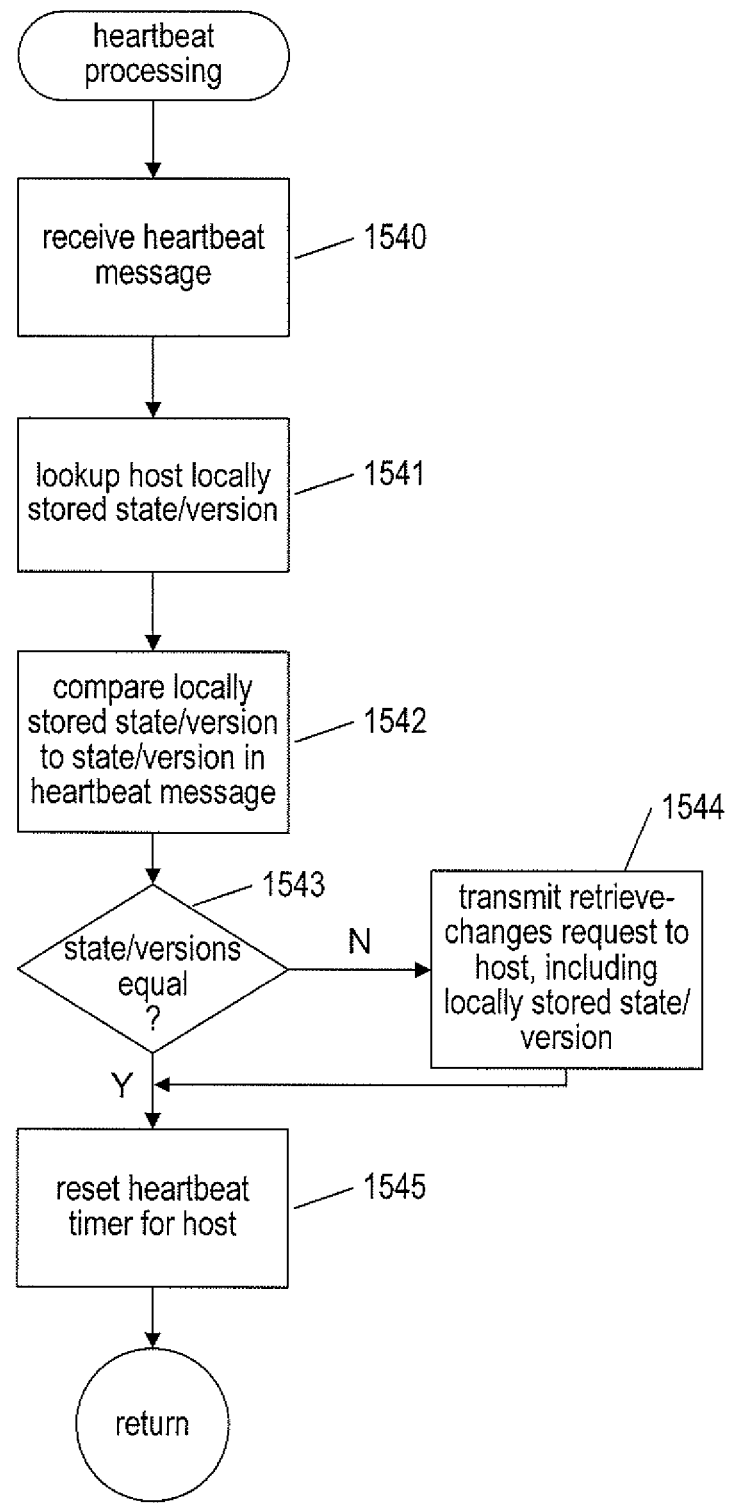

FIG. 15G illustrates the heartbeat-processing handler called at step 1535 of FIG. 15F. In step 1540, the heartbeat-processing handler receives a heartbeat message forwarded to the management server from a host server. In step 1541, the heartbeat-processing handler looks up the current state/version indication stored for the host server from which the heartbeat message was received. In step 1542, the heartbeat-processing handler compares the locally stored state/version indication with the state/version indication contained in the heartbeat message. When the two state/version indications are not equal, as determined in step 1443, then the heartbeat-processing handler, in step 1544, transmits a retrieve-changes request to the host server from which the heartbeat message was received, including in the retrieve-changes request the locally stored state/version indication. Finally in step 1545, the heartbeat timer for the host from which the heartbeat message was received is reset.

The host-management-interface/VPXA agent communications protocol and information exchanged include many additional details not shown in FIGS. 15A-F. A full description of these interfaces, the commands and information exchanged through them, and other details of VPX-agent implementation and VI management server implementation would require many hundreds of pages of description and hundreds of illustrative figures. However, these details are unnecessary for describing host-cluster aggregation via host gateways, and are therefore omitted from the current document.

Figure 16A:
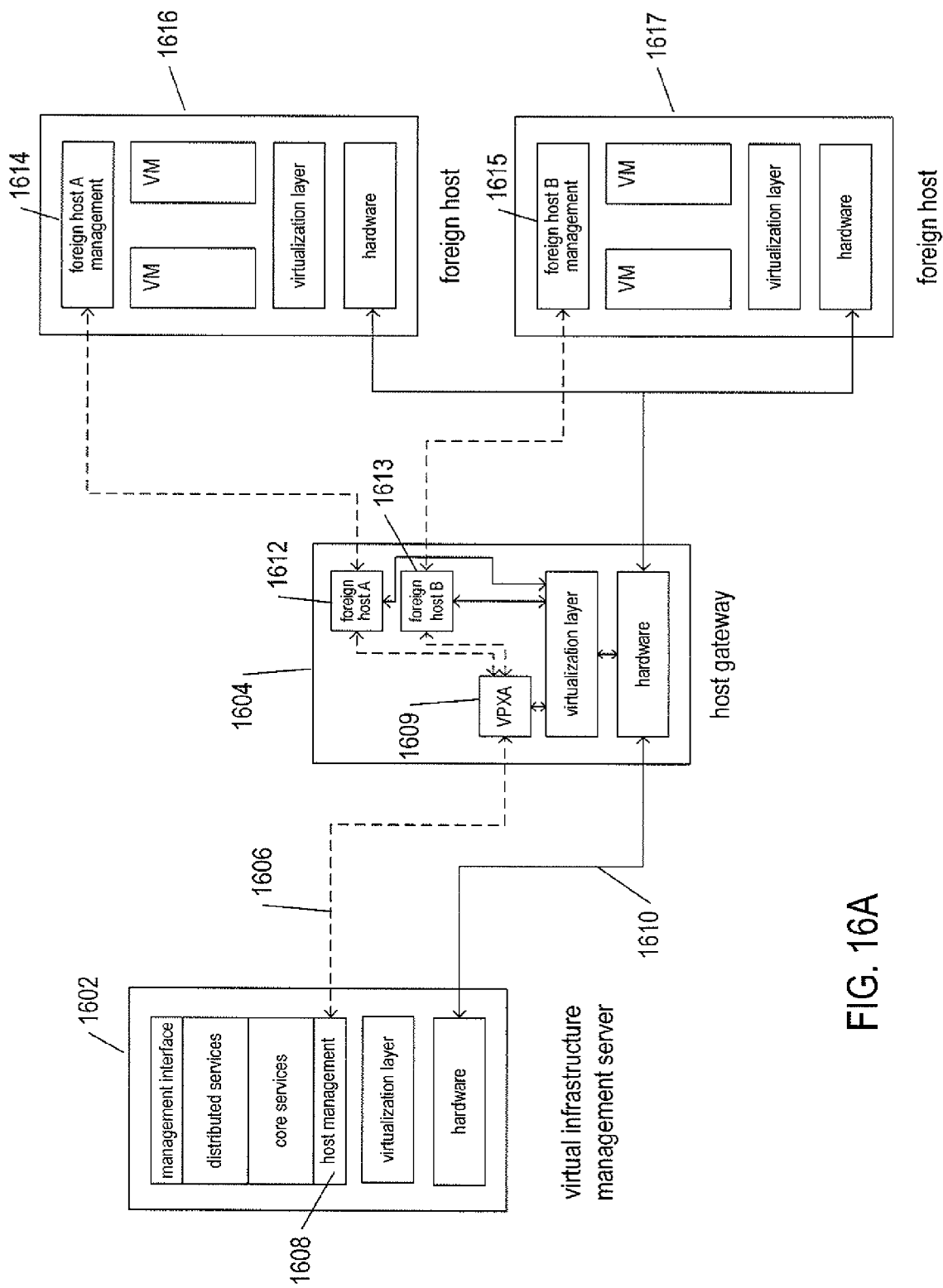
FIGS. 16A-E illustrate a host-gateway appliance that has been developed in order to, among other things, connect hosts running different types of virtualization layers to a VI management server that includes a host-management interface designed to interface to host servers with a specific type of virtualization layer.

FIGS. 16A-E illustrate a host-gateway appliance that has been developed in order to, among other things, connect hosts running different types of virtualization layers to a VI management server that includes a host-management interface designed to interface to host servers with a specific type of virtualization layer. FIG. 16A shows interconnection of a VI management server via a host-gateway appliance to two foreign hosts. Foreign hosts are host servers running virtualization layers different from the virtualization layer to which the host-management interface within the VI management server is designed to interface. As in FIG. 14, the VI management server 1602 connects to the host-gateway appliance 1604 via a logical communications pathway 1606 provided by the host-management interface 1608 within the VI management server, a VPXA agent 1609 within the host-gateway appliance 1604, and an underlying hardware-level communications pathway 1610. However, within the host-gateway appliance, the VPXA agent interfaces to a first foreign-host adapter 1612 and a second foreign-host adapter 1613 that, in turn, interface to foreign-host management interfaces 1614 and 1615, respectively, within a first foreign host system 1616 and a second foreign host system 1617. In general, the host-gateway appliance includes a different foreign-host adapter for each different type of virtualization layer included in the foreign-host systems interconnected by the host-gateway appliance to the VI management server. In essence, the foreign-host adaptors 1612 and 1613 implement communications pathways to foreign-host management interfaces that replace or substitute a hostd process within a host executing the virtualization layer to which the host-management interface of the VI management server is designed to interface.

Figure 16B:
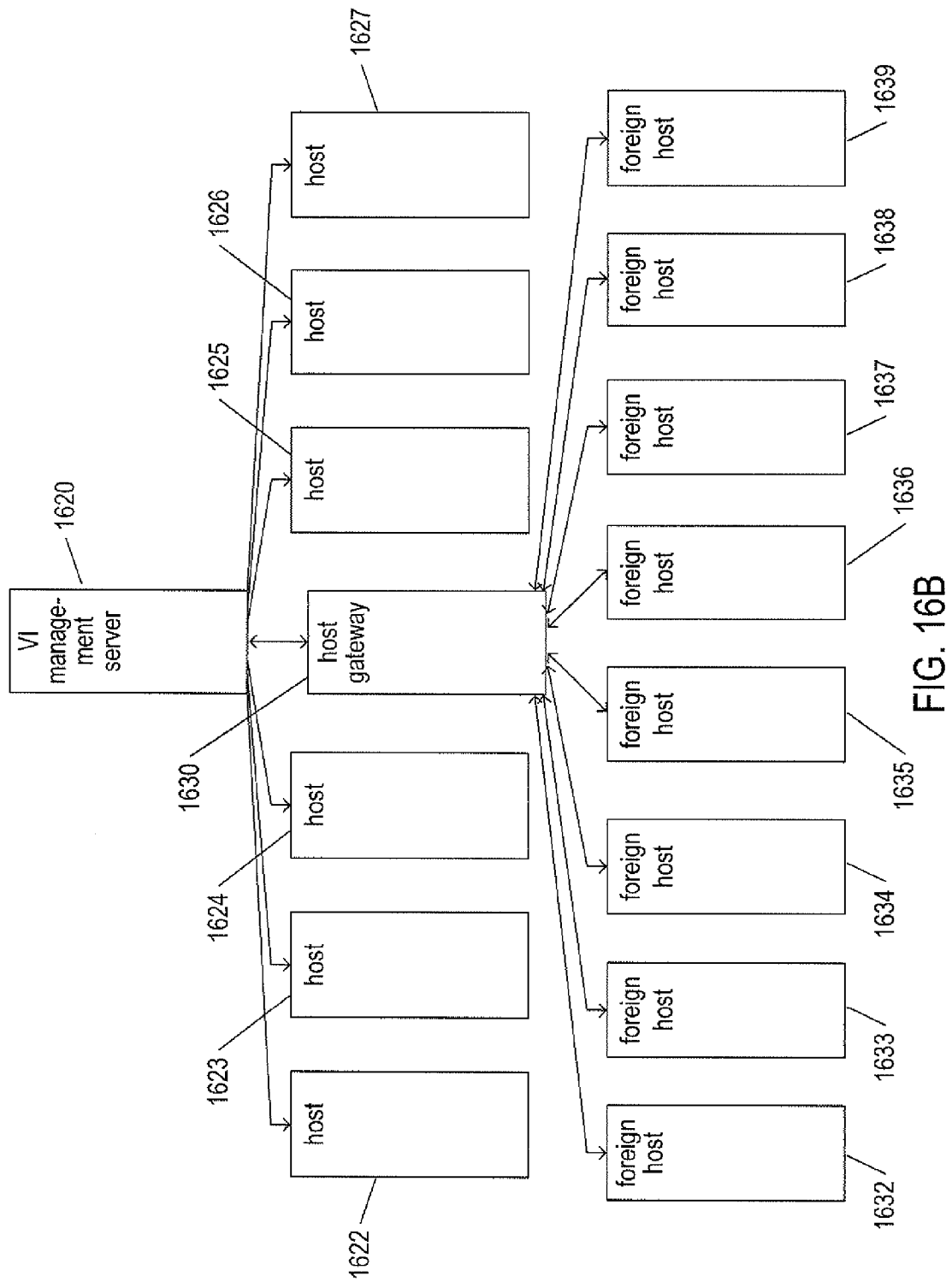

FIG. 16B illustrates a virtual data center that includes both native hosts managed directly by a VI management server and foreign hosts managed by the VI management server via a host-gateway appliance. In FIG. 16B, the VI management server 1620 manages native host systems 1622-1627 through the host-management-interface/VPXA-agent communications pathway discussed above with reference to FIG. 14. The VI management server 1620 additionally connects to a host-gateway appliance 1630, as discussed above with reference to FIG. 16A, in order to interface to, and manage, a number of foreign host servers 1632-1639. In order to provide an interconnection between the VI management server and foreign hosts, the host-gateway appliance includes a VPXA agent that is modified to interface to foreign-host adapters, rather than to a single hostd process, as discussed above with reference to FIG. 14.

Figure 16C:
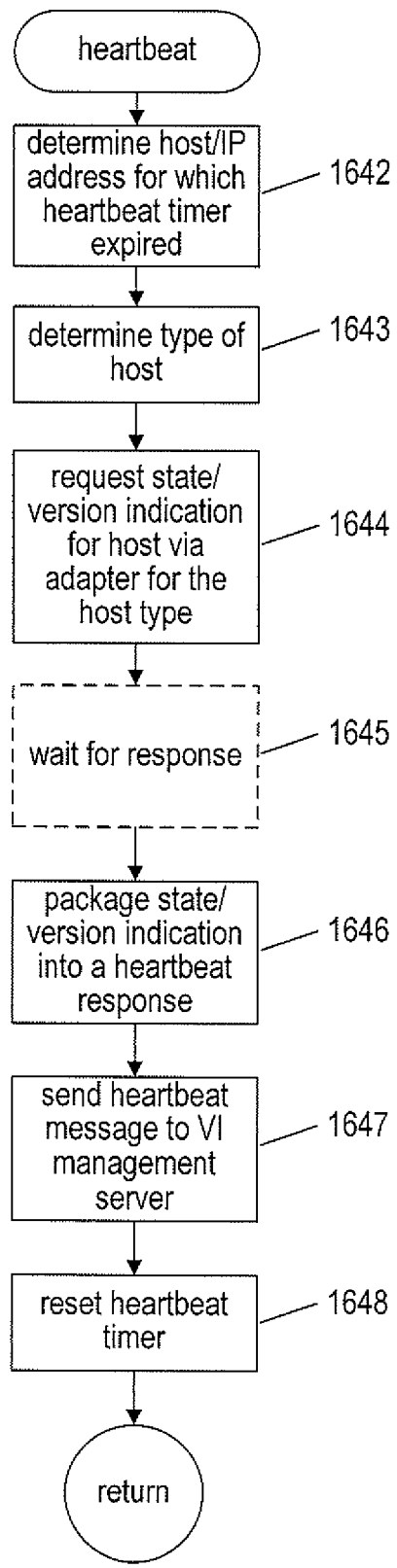
Figure 16D:
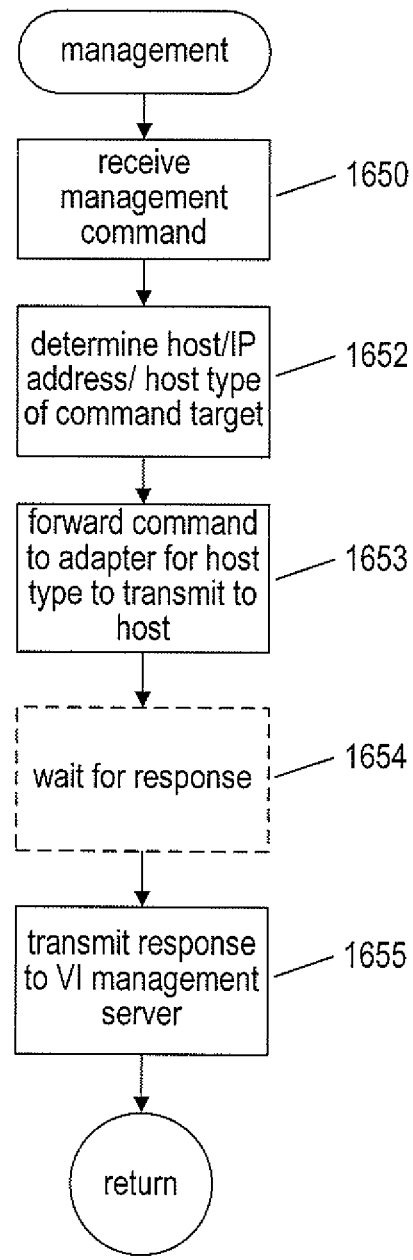
Figure 16E:
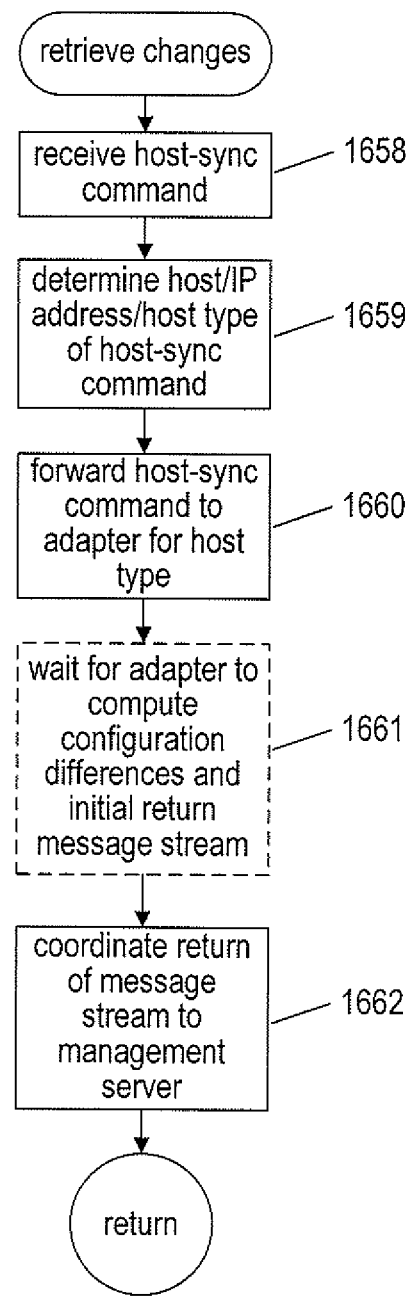

FIGS. 16C-E illustrate, using control-flow diagrams, modifications to the event handlers discussed above with reference to FIGS. 15B-D that execute within an event loop of a native VPXA agent running within a native host. In the heartbeat handler illustrated in FIG. 16C, the heartbeat handler determines the host and an IP address for the host for which the heartbeat timer expired, in step 1642. In step 1643, the heartbeat handler determines the type of host corresponding to the heartbeat-timer expiration. The information used to make this determination is stored by the VPXA process in the VM kernel file system, in the currently described implementation. In step 1644, the heartbeat handler requests a current state/version indication for the host server corresponding to the heartbeat-timer expiration via the foreign-host adapter for the determined host type. In step 1645, the heartbeat handler waits for a response to this request. The heartbeat handler may actually wait for a response or may instead terminate, at this point, with the response handled by an additional state/version-indication-request handler. The dashed-line representation of the wait-for-response step 1645 indicates that any of many different types of techniques for waiting for, and processing, an asynchronously executed command can be used to handle the response returned by the foreign-host adapter. This same illustration convention is used in subsequent figures to indicate two or more possible approaches for handling asynchronous responses. In step 1646, the state/version indication returned by the foreign-host adapter for the host corresponding to the heartbeat-timer expiration handled by the heartbeat handler is packaged into a heartbeat response which is then sent, in step 1647, to the VI management server. In step 1648, the heartbeat timer is reset. Note that the foreign-host adapter, upon receiving the request for the state/version indication, may either immediately return a state/version indication stored for the host system based on a separate heartbeat protocol carried out between the foreign-host adapter and foreign hosts or may request information from the management interface of the foreign host, via a communications protocol, and then transform the returned information into the state/version indication returned to the VI management server in step 1647.

FIG. 16D provides a control-flow-diagram illustration of the management handler within the VPXA agent of a host-gateway appliance. In step 1650, the management handler receives a management command forwarded to the host-gateway appliance by the VI management server. In step 1652, the management handler determines the host, IP address for the host, and the type of the host to which the management command is directed, using locally stored information. In step 1653, the management handler forwards the management command and the determined information to the foreign-host adapter for the host type determined in step 1652. In step 1654, the management handler either waits for the response or terminates, with the response handled by an additional management-command-response handler. Finally, in step 1655, the management handler transmits the response received from the foreign-host adapter to the VI management server.

FIG. 16E illustrates the retrieve-changes handler executed in response to a retrieve-changes event within a VPXA-agent event loop for a VPXA agent executing within a host-gateway appliance. In step 1658, the retrieve-changes handler receives a retrieve-changes command sent to the host-gateway appliance by the VI management server. In step 1659, the host, IP address of the host, and type of host are determined. In step 1660, the retrieve-changes command, along with the information determined in step 1659, are forwarded to the foreign-host adapter corresponding to the determined host type. In step 1661, the host sync handler either waits for the foreign-host adapter to obtain configuration differences and initiate a return message stream or terminates, with an additional retrieve-changes-response handler invoked when the return message stream is initiated. In step 1662, the retrieve-changes handler coordinates return of the messages in the message stream to the VI management server.

The host-gateway appliance may have uses in addition to connection of foreign hosts to VI management servers. For example, a host-gateway appliance can be used in order to provide access, by a VI management server, to multiple native host systems via a single IP address associated with a host-gateway appliance. Alternatively, the host-gateway appliance can be used so that VDC management server commands are transmitted to native hosts connected to the host-gateway appliance via an IP address different from the IP addresses by which the native host systems are directly connected to for other purposes. In these cases, a native-host adapter, equivalent to the foreign-host adapters discussed above with reference to FIG. 16A, is included in the host-gateway appliance to allow the VPXA agent within the host-gateway appliance to communicate with VPXA agents within native hosts connected by the host-gateway appliance to the VI management server.

Figure 17:
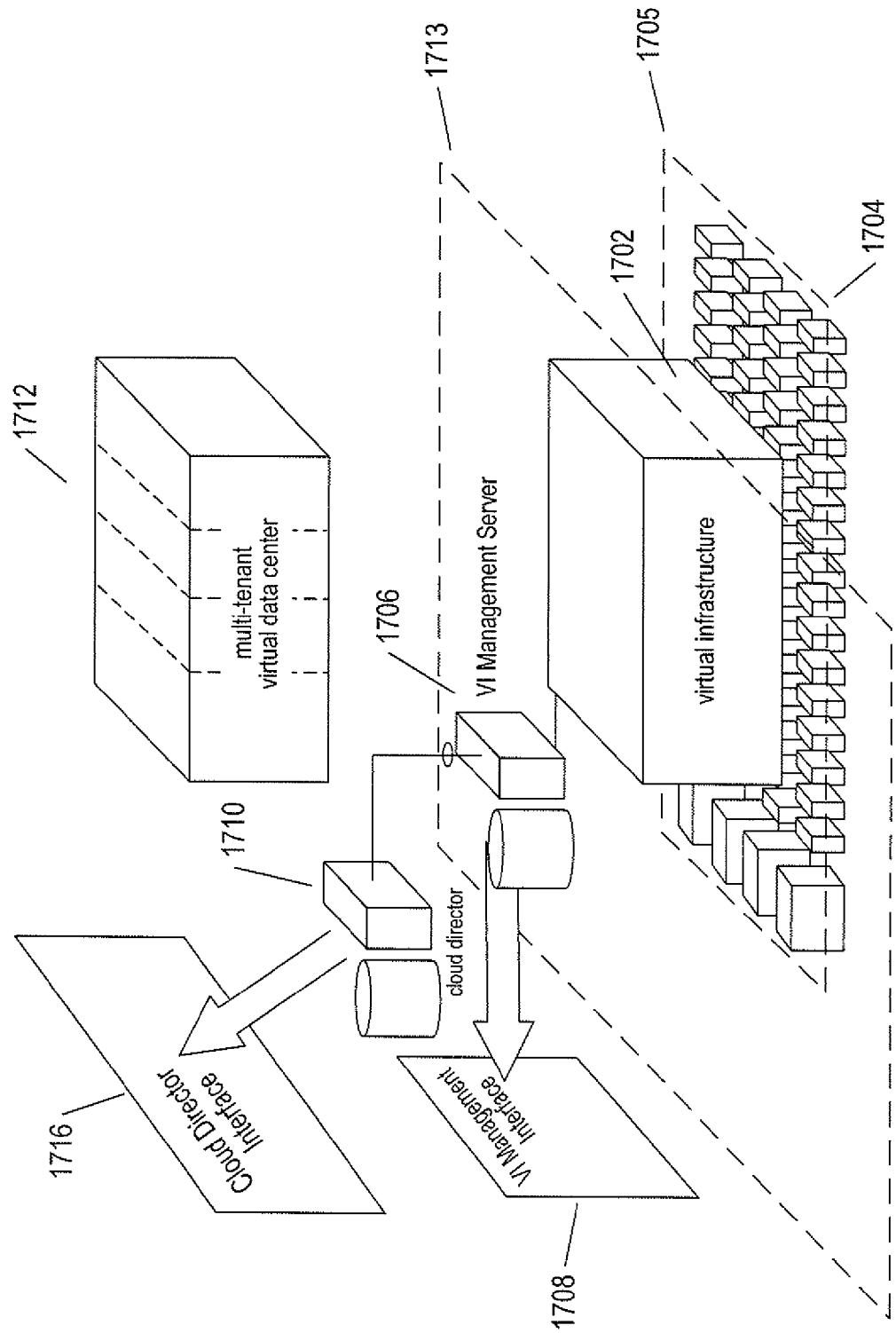
FIG. 17 illustrates a problem encountered by many virtual-infrastructure owners, administrators, and users.

Method and System for Managing a Cloud-Computing Facility Through a VI Management Server FIG. 17 illustrates a problem encountered by many virtual-infrastructure owners, administrators, and users. FIG. 17 shows a virtual infrastructure 1702 which, as discussed above with reference to FIGS. 7-8, is an abstraction of an underlying physical data center 1704 created and managed by a VI management server 1706, as represented by transparent plane 1705. The VI management server 1706 provides a VI management interface 1708 to system administrators, owners, and various types of users. As discussed above with reference to FIG. 9, cloud director 1710 interfaces to the VI management server and virtual infrastructure to create a multi-tenant-virtual-data-center 1712 higher-level abstraction. The second horizontal plane 1713 in FIG. 17 represents a cloud-director-mediated abstraction of the virtual infrastructure 1702 to the multi-tenant virtual data center 1712. The cloud director provides a cloud-director interface 1716 through which system administrators, owners, and other users can access and manage the multi-tenant virtual-data-center abstraction. There is, however, a significant problem associated with this higher level of abstraction for many system administrators, owners, and users of virtual infrastructures. Many system administrators, owners, and users of virtual infrastructures have developed significant bodies of management scripts and packages for managing their virtual infrastructure through the VI management interface 1708. The cloud director interface 1716 is quite different than the VI management interface. For example, the cloud-director interface does not expose individual host servers to system administrators and other users, but instead exposes a higher-level abstraction that allows system administrators and users to provision and launch VMs without regard to underlying virtual or physical host servers. When system administrators and owners of virtual infrastructures wish to access these virtual infrastructures as cloud-computing facilities, or wish to move private virtual infrastructures to cloud-computing facilities, they face the problem of completely rewriting and redeveloping the many scripts and management tools directed to the VI management interface 1708 that they have previously developed and used. These management tools and scripts need to be rewritten in order to interface to the virtual data center abstraction through the cloud-director interface 1716.

Figure 18:
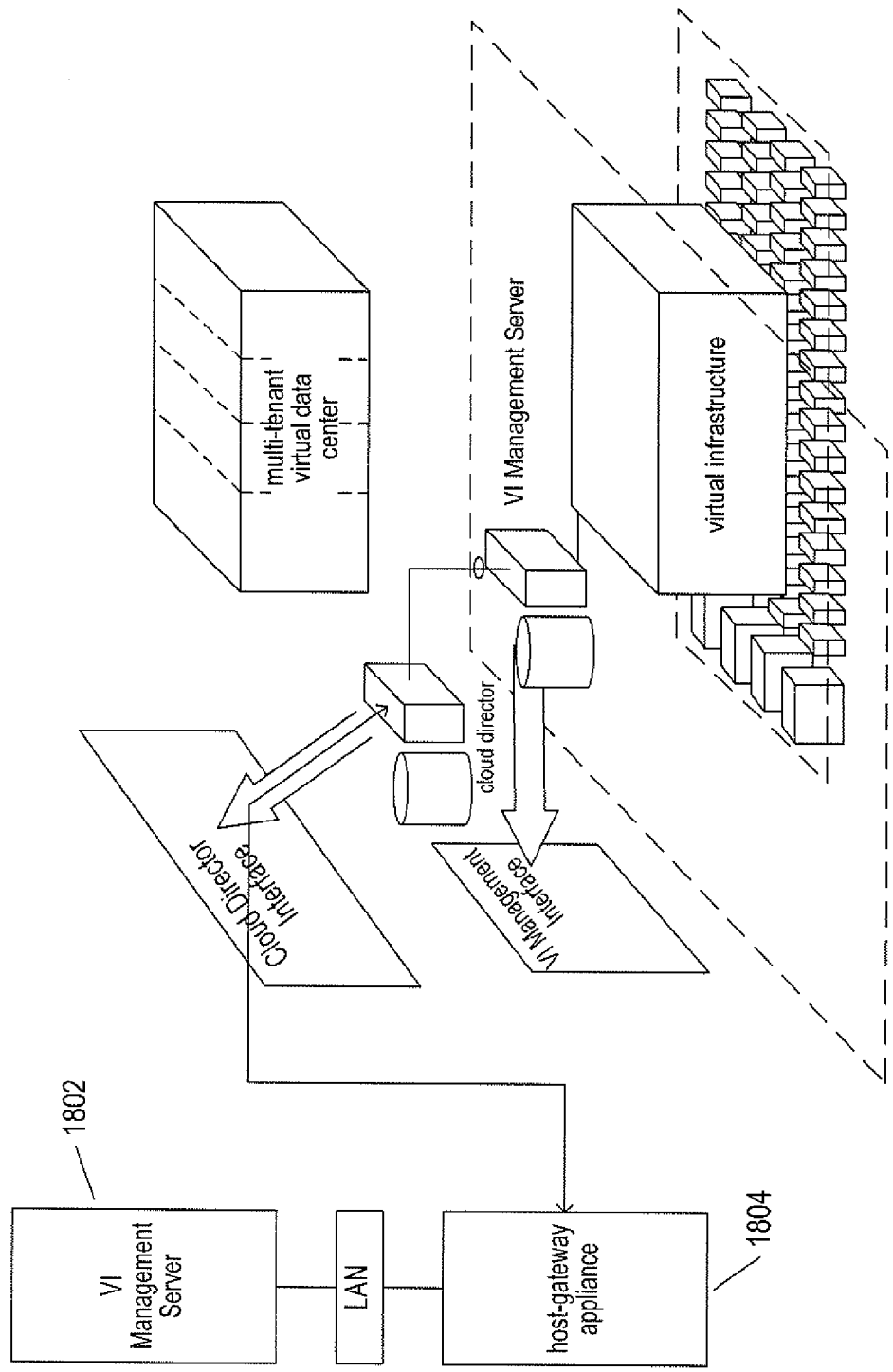
FIG. 18 illustrates a solution to the problem discussed above with reference to FIG. 17.

FIG. 18 illustrates a solution to the problem discussed above with reference to FIG. 17. Rather than forcing virtual-infrastructure users to adopt to the cloud-director interface in order to move virtual infrastructures to the cloud or to administer and access a virtual infrastructure through the cloud-director interface, the virtual-infrastructure administrators and users can instead be provided with a connection from a VI management server 1802 to a host gateway appliance 1804 that contains a foreign-host adapter, discussed above with reference to FIGS. 14-16E, that creates the illusion that the VI management server 1802 is accessing a host server when, in fact, the VI management server is accessing, through the host-gateway appliance 1804, the cloud-director interface of a cloud director that manages a virtual data center.

Figure 19:
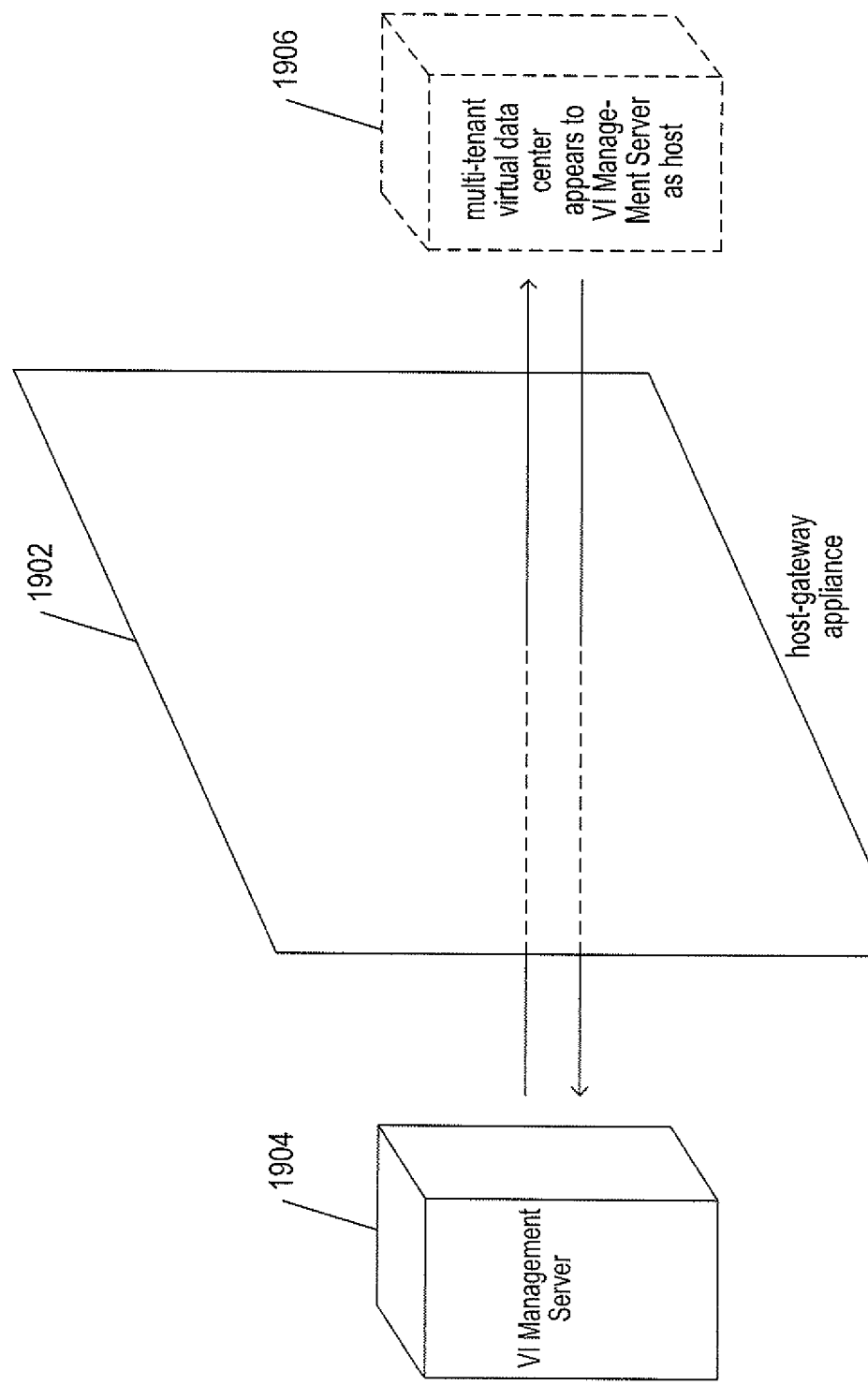
FIG. 19 illustrates the function of the host-gateway appliance in the application of abstracting a virtual data center as a foreign host.

FIG. 19 illustrates the function of the host-gateway appliance in the application of abstracting a virtual data center as a foreign host. The host-gateway appliance provides a transparent interface 1902 to the VI management server 1904 through which the VI management server 1904 sees a virtual data center as a host managed by the VI management server 1906. In this application, the foreign-host adapter functions primarily as a pass-through translator that translates VI-management-interface commands to cloud-director-interface commands, in a forward direction from the VI management server to the virtual data center, and that translates cloud-director-interface command responses, in a reverse direction, from the virtual data center to the VI management server. In addition, the foreign-host adapter provides heartbeat messages and sufficient simulated/translated host state to convince the VI management server that the VI management server is communicating with a host server.

Figure 20:
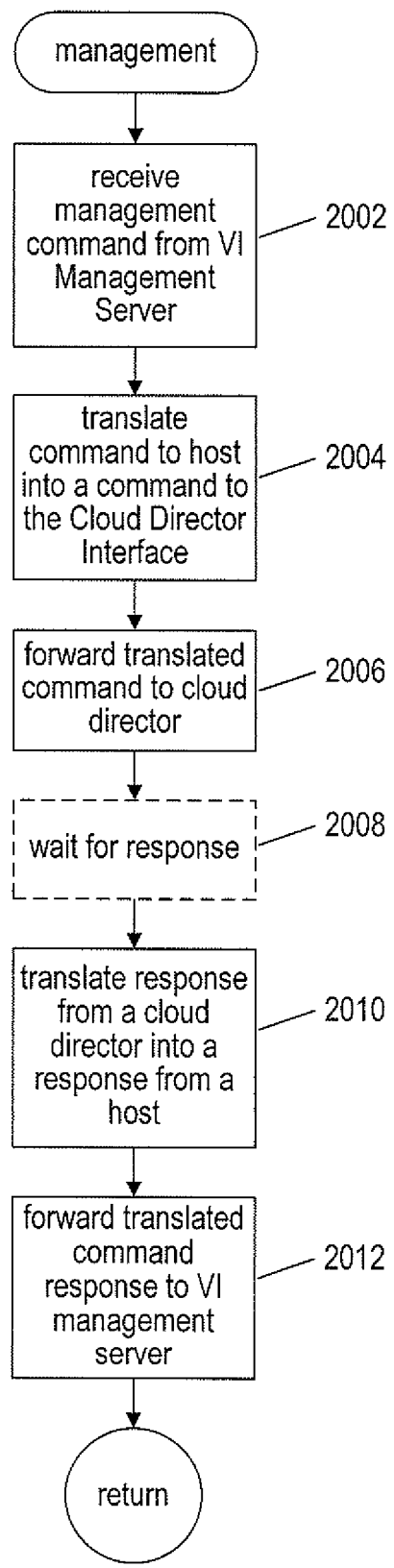
FIG. 20 illustrates processing of management commands received from the VI management server by the foreign host adapter in the application of the host gateway appliance discussed above with reference to FIGS. 17-19.

FIG. 20 provides a control-flow diagram that illustrates processing of management commands received from the VI management server by the foreign-host adapter in the application of the host gateway appliance discussed above with reference to FIGS. 17-19. In step 2002, the foreign-host adapter receives a management command from the VI management server. In step 2004, the foreign-host adapter translates the received management command, directed by the VI management server to a host server, into a command that can be directed to the cloud-director interface. In step 2006, the translated command is forwarded to the cloud director. In step 2008, the foreign-host adapter waits for a response from the cloud director. In step 2010, the foreign-host adapter translates the response received from the cloud director into a response that appears to have been transmitted by a host server. Finally, in step 2012, the foreign-host adapter forwards the translated response to the VI management server. Of course, IP-address remappings are carried out so that the VI management server and cloud director send commands and command responses, respectively, to the host-gateway appliance, rather than directly exchanging commands and responses.

In general, the foreign-host adapter may support only a subset of the total set of management commands that can be issued by VI management servers to host servers. In certain cases, particular types of VI-management-interface commands may be simply ignored by the foreign-host adapter. In other cases, the foreign-host adapter may contain simple templates and scripts to respond to VI-management-interface commands without translating and forwarding the commands to the cloud-director interface, when these commands are only necessary for maintaining the illusion that the remote virtual data center is a host server. In the majority of cases, the foreign-host adapter translates the VI management server command into a command directed to the cloud-director interface that accomplishes the goal of the VI management server command, such as provisioning and launching new VMs and other such VM-based control and configuration operations.

Although the present invention has been described in terms of particular embodiments, it is not intended that the invention be limited to these embodiments. Modifications within the spirit of the invention will be apparent to those skilled in the art. For example, any of many different design and implementation parameters may be varied in order to generate a variety of different implementations of the above-disclosed methods and systems, including choice of native virtualization layers, programming languages, communications protocols, modular organization, data structures, control structures, and other such design and implementation parameters. Similar techniques can be used to generate foreign-host adapters to translate VT-management-interfaces to other types of management interfaces, including the management interface provided by the above-discussed VCC servers.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded in the widest scope consistent with the principles and novel features disclosed herein.

The invention claimed is:

1. A distributed computing system comprising:
    a first management server that includes one or more processors, one or more memories, and communications controllers and hardware and that provides a first management interface for managing a virtual infrastructure;
    a second management server that includes one or more processors, one or more memories, and communications controllers and hardware and that provides a second management interface, different from the first management interface, for managing an abstraction of the virtual infrastructure; and
    a host-gateway appliance that connects the first management server to the second management interface while providing an illusion, to the first management server, that the first management server is instead connected to, and managing, a host server within a virtual infrastructure.

2. The distributed computing system of claim 1 wherein the host-gateway appliance comprises:
    a server computer with hardware, virtualization, and system-processes-and-virtual-machine layers;
    a communications process that is logically connected to a host-management interface within the first management server; and
    a foreign-host adapter to which the communication process interfaces, the foreign-host adapter logically connected to the second management interface provided by the second management server.

3. The distributed computing system of claim 2 wherein the foreign-host adapter translates selected first-management-interface commands received through the communications process from the first management server to second-management-interface commands and directs the second-management-interface commands to the second management interface provided by the second management server.

4. The distributed computing system of claim 3 wherein the foreign-host adapter translates second-management-interface command responses received, through the second management interface, from the second management server to first-management-interface command responses and directs the first-management-interface command responses to the first management interface, provided by the first management server, through the communications process.

5. The distributed computing system of claim 2 wherein the foreign-host adapter disregards selected first-management-interface messages received through the communications process from the first management server.

6. The distributed computing system of claim 2 wherein the foreign-host adapter generates, from stored information local to the host-gateway appliance, command responses to selected first-management-interface messages received through the communications process from the first management server and returns the command responses to the first management interface, provided by the first management server, through the communications process.

7. The distributed computing system of claim 2 wherein the host-gateway appliance periodically generates a heartbeat message for the illusory host server to which the host-gateway appliance abstracts the abstraction of the virtual infrastructure managed by the second management server.

8. The distributed computing system of claim 1 wherein the second management interface is a cloud-director-provided virtual-data-center management interface.

9. The distributed computing system of claim 1 wherein the second management interface is VCC-server-provided virtual-data-center-aggregation management interface.

10. A method that allows a first management server, which provides a first management interface to a virtual infrastructure, to manage the virtual infrastructure through a second management interface, different from the first management interface, that manages an abstraction of the virtual infrastructure, the method comprising:
    providing the first management server, which includes one or more processors, one or more memories, and communications controllers and hardware and that provides a first management interface for managing a virtual infrastructure;
    providing a second management server that includes one or more processors, one or more memories, and communications controllers and hardware and that provides a second management interface, different from the first management interface, for managing an abstraction of the virtual infrastructure; and
    connecting the first and second management servers through a host-gateway appliance that provides an illusion, to the first management server, that the first management server is instead connected to, and managing, a host server within a virtual infrastructure.

11. The method of claim 10 wherein the host-gateway appliance comprises:
    a server computer with hardware, virtualization, and system-processes-and-virtual-machine layers;
    a communications process that is logically connected to a host-management interface within the first management server; and
    a foreign-host adapter to which the communication process interfaces, the foreign-host adapter logically connected to the second management interface provided by the second management server.

12. The method of claim 11 wherein the foreign-host adapter translates selected first-management-interface commands received through the communications process from the first management server to second-management-interface commands and directs the second-management-interface commands to the second management interface provided by the second management server.

13. The method of claim 12, wherein the foreign-host adapter translates second-management-interface command responses received, through the second management interface, from the second management server to first-management-interface command responses and directs the first-management-interface command responses to the first management interface, provided by the first management server, through the communication process.

14. The method of claim 11 wherein the foreign-host adapter disregards selected first-management-interface messages received through the communications process from the first management server.

15. The method of claim 11 wherein the foreign-host adapter generates, from stored information local to the host-gateway appliance, command responses to selected first-management-interface messages received through the communications process from the first management server and returns the command responses to the first management interface, provided by the first management server, through the communications process.

16. The method of claim 11 wherein the host-gateway appliance periodically generates a heartbeat message for the illusory host server to which the host-gateway appliance abstracts the abstraction of the virtual infrastructure managed by the second management server.

17. The method of claim 10 wherein the second management interface is cloud-director-provided virtual-data-center management interface.

18. The method of claim 10 wherein the second management interface is VCC-server-provided virtual-data-center-aggregation management interface.

19. A physical data-storage device that stores computer instructions that, when executed by one or more processes of a host-gateway device, controls the host-gateway device to:
   connect a first management server, which provides a first management interface to a virtual infrastructure, to a second management server, which provides a second management interface, different from the first management interface, for managing an abstraction of the virtual infrastructure; and
   provide an illusion, to the first management server, that the first management server is instead connected to, and managing, a host server within the virtual infrastructure.

20. The physical data-storage device of claim 19 wherein the host-gateway appliance comprises:
   a server computer with hardware, virtualization, and system-processes-and-virtual-machine layers;
   a communications process that is logically connected to a host-management interface within the first management server; and
   a foreign-host adapter to which the communication process interfaces, the foreign-host adapter logically connected to the second management interface provided by the second management server.

* * * * *